United States Patent [19]
Yamaji et al.

[11] Patent Number: 5,721,601
[45] Date of Patent: Feb. 24, 1998

[54] DISPLAY UNITS HAVING TWO INSOLATING FILMS AND A PLANARIZING FILM AND PROCESS FOR PRODUCING THE SAME

[75] Inventors: Toshifumi Yamaji, Aichi-ken; Kou Masahara, Gifu-ken; Nobuhiko Oda; Koji Suzuki, both of Hashima; Shiro Nakanishi, Ogaki; Hisashi Abe; Kiyoshi Yoneda, both of Gifu-ken; Yoshihiro Morimoto, Inazawa, all of Japan

[73] Assignee: Sanyo Electric Co., Ltd., Osaka, Japan

[21] Appl. No.: 532,484

[22] Filed: Sep. 22, 1995

[30] Foreign Application Priority Data

Sep. 29, 1994 [JP] Japan ................................. 6-235522
Aug. 1, 1995 [JP] Japan ................................. 7-196779

[51] Int. Cl.$^6$ .............................................. G02F 1/1333
[52] U.S. Cl. ............................................ 349/138; 349/122
[58] Field of Search ........................... 349/122, 138, 349/149

[56] References Cited

U.S. PATENT DOCUMENTS

| | | | |
|---|---|---|---|
| 4,239,346 | 12/1980 | Lloyd | 350/350 |
| 5,056,895 | 10/1991 | Kahn | 349/122 |
| 5,084,905 | 1/1992 | Sasaki et al. | 349/138 |
| 5,537,234 | 7/1996 | Williams et al. | 349/149 |
| 5,612,799 | 3/1997 | Yamazaki et al. | 349/42 |
| 5,621,556 | 4/1997 | Fulks et al. | 349/42 |

FOREIGN PATENT DOCUMENTS

| | | | |
|---|---|---|---|
| 1-156725 | 6/1989 | Japan | 349/138 |
| 2-234134 | 9/1990 | Japan | 349/138 |
| 4-291240 | 10/1992 | Japan | 349/138 |
| 5-34718 | 2/1993 | Japan | 349/138 |
| 6-11728 | 1/1994 | Japan | 349/138 |

*Primary Examiner*—William L. Sikes
*Assistant Examiner*—James A. Dudek
*Attorney, Agent, or Firm*—Sheridan Ross P.C.

[57] ABSTRACT

A liquid crystal display unit is described, which includes a first substrate, a second substrate opposing to the first substrate, pixel driving elements, first and second insulation layers, a planarizing film and a liquid crystal layer. The pixel driving elements are disposed on the first substrate and between the first and second substrates. The first insulation layer is deposited over the first substrate and the pixel driving elements. The planarizing film is formed on the first insulation layer. This planarizing film provides a substantially flat surface over the first substrate to minimize a height of a step present between an area corresponding to each pixel driving element and an area locating adjacent to the pixel driving element on the first substrate. The second insulation layer is formed on the planarizing film. The display electrodes are formed on the second insulation layer and electrically connected to the pixel driving elements, respectively. The liquid crystal layer is located between the first substrate and said second substrate.

26 Claims, 17 Drawing Sheets

DISPLAY UNITS HAVING TWO INSOLATING FILMS AND A PLANARIZING FILM AND PROCESS FOR PRODUCING THE SAME

BACKGROUND OF THE INVENTION

1. Field of the Invention

The present invention relates generally to a display unit and a process for producing the same. More particularly, the present invention relates to a display unit employing thin film transistors and a process for producing the same.

2. Description of the Related Art

Recently, active matrix addressing mode liquid crystal displays (LCD) employing thin film transistors (TFT's) are noted as high-image quality display units. Dot matrix LCD's employing dots arranged in the form of matrix are classified into two types: simple matrix addressing mode and active matrix addressing mode.

In the simple matrix addressing mode, the liquid crystal in the pixels arranged in the matrix is directly driven in synchronization with scanning signals. A liquid crystal panel of the LCD consists of electrodes and a liquid crystal. Accordingly, when the number of scanning lines is increased, the duty cycle for each pixel is shortened. This brings about contrast reduction.

In the active matrix addressing mode, each pixel arranged in the matrix has an active element as a pixel driving element and a signal storage element (i.e. pixel capacitance). Both the driving element and the storage element are integrated in the pixel. Each pixel performs signal storing behavior, and the liquid crystal is driven semi-statically. In other words, the pixel driving element functions as a switch element which is controlled in response to scanning signals. When the pixel driving element is actuated, the associated pixel receives a data signal indicating display data via the pixel driving element to drive the liquid crystal. When the pixel driving element is then deactuated, the data signal applied to the pixel is stored in the form of electric charge in the associated signal storage element. Driving of the liquid crystal is continuously controlled based on the electric charge thus stored until the pixel driving element resumes an ON-state. Accordingly, in spite of the fact that the driving time for each pixel is reduced due to the increased number of the scanning lines, driving control of the liquid crystal is not affected and there is no contrast reduction. Therefore, the active matrix addressing mode provides a very high image quality display unit compared with the simple matrix addressing mode.

The active matrix addressing mode is classified depending on the type of the pixel driving elements into two types; three-terminal transistor type and diode type. Although the transistor type matrix addressing mode involves difficulties in production compared with the diode type matrix driving mode, the transistor type has superior contrast and resolution properties as compared to the diode type. Further, the transistor type matrix addressing mode permits to attainment of CRT image quality in LCD units.

Thin film transistors (TFT) are generally employed as pixel driving elements in the transistor type LCD's. The active layer in a TFT is a semiconductor thin film formed on an insulating substrate and generally is an amorphous silicon film or a polycrystalline silicon film. As the active layer, cadmium selenide (CdSe) and tellurium (Te) may be employed. A TFT employing an amorphous silicon film as the active layer is referred to as amorphous silicon TFT; whereas a TFT employing a polycrystalline silicon film as the active layer is referred to as polycrystalline silicon TFT. The polycrystalline silicon TFT has an advantage over the amorphous silicon TFT in that it has higher field effect mobility and higher driving capability, so that it is used not only as the pixel driving element but also as an element for constituting a logic circuit. Accordingly, use of the polycrystalline TFT permits integration of the pixel portion of the LCD and peripheral driving circuit on the same substrate. This enables fabrication of the polycrystalline silicon TFT as the pixel driving element and the polycrystalline silicon TFT as the peripheral driving circuit in one step.

FIG. 1 is a block diagram showing the constitution of a general active matrix addressing mode LCD. This LCD has a pixel portion 50 and a peripheral driving circuit 53 connected thereto. The peripheral driving circuit 53 contains a gate driver 51 and a drain driver 52. The pixel portion 50 has a plurality of scanning lines (i.e. gate wirings) $G_1 \ldots G_n$, $G_{n+1} \ldots G_m$ and a plurality of data lines (i.e. drain wirings) $D_1 \ldots D_n, D_{n+1} \ldots D_m$. Further, the pixel portion 50 has a plurality of pixels 60 disposed in rectangular sections defined by the gate wirings and drain wirings which intersect orthogonal with one another. The group of gate wirings are connected to a gate driver 51 which supplies gate signals or scanning signals to them. The group of drain wirings are connected to a drain driver 52 which supplies data signals or video signals to them. At least one of the drivers 51 and 52 is formed on the same substrate as the pixel portion 50 is formed. Such an LCD is generally referred to as integrated driver type LCD or built-in driver type LCD. Incidentally, the gate driver 51 may be provided on each side of the pixel portion 50. Further, the drain driver 52 may be provided on each side of the pixel portion 50.

FIG. 2 shows an equivalent circuit in a pixel 60 disposed between the gate wiring $G_n$ and the drain wiring $D_n$. The pixel 60 contains a TFT 161 as the pixel driving element, a liquid crystal cell LC and an auxiliary capacitance CS. The TFT 161 has a gate connected to the gate wiring $G_n$ and a drain connected to the drain wiring $D_n$. The source of the TFT 161 is connected to a display electrode (i.e. pixel electrode) of the liquid crystal cell LC and to the auxiliary capacitance CS. The liquid crystal cell LC and the auxiliary capacitance CS constitute the signal storage element. A voltage Vcom is applied to a common electrode LCE2 of the liquid crystal cells LC. The common electrode in each liquid crystal cell LC is shared by all of the pixels 60. A capacitance is established between a display electrode LCE1 and the common electrode LCE2 of the liquid crystal cell LC. The auxiliary capacitance CS has a first electrode CSE1 connected to the source of the TFT and a second electrode CSE2 to which a constant voltage VR is applied. The second electrode CSE2 may be connected to the adjacent gate wiring $G_{n+1}$.

When a positive voltage is applied to the gate of the TFT 161 in the pixel 60 by the positive voltage applied to the gate wiring $G_n$, the TFT 161 is allowed to assume an ON-state. Thus, the liquid crystal cell LC and the auxiliary capacitance CS are charged based on the data signal applied to the drain wiring $D_n$. On the contrary, when a negative voltage is applied to the gate of the TFT 161 by the negative voltage applied to the gate wiring $G_n$, the TFT 161 assumes an OFF-state. The voltage applied to the drain wiring $D_n$ at that time is held by the liquid crystal cell LC and the auxiliary capacitance CS. Thus, the supply of the data signals to be written in the pixels 60 via the drain wirings and the voltage control with respect to the gate wirings enable the pixels 60 to hold desired data signals. Transmittance of the liquid crystal cells LC change depending on the data signals held by the pixels 60, respectively, and thus an image is produced on the display.

Writing property and holding property are important for the pixels 60. The writing property means the ability of the liquid crystal cell LC and the auxiliary capacitance CS to write an arbitrary video signal voltage within a predetermined unit time in accordance with the specifications of the pixel portion 50. In the writing property, the video signal voltages should be written fully within the unit time. The holding property means the time that the liquid crystal cell LC and the auxiliary capacitance CS can hold the thus written video signal voltages. In the holding property, the video signal voltages should be held for a necessary time. The auxiliary capacitance CS promotes improvement of the writing property and holding property. The reason is that the auxiliary capacitance CS compensates for the insufficiency in the capacitance of the liquid crystal cell LC, which cannot be increased greatly. In other words, the auxiliary capacitance CS permits formation of a signal storage element having an increased capacitance.

FIG. 3 is a schematic cross-sectional view of a pixel 60 in a prior art LCD unit. The pixel 60 has a planar polycrystalline silicon TFT as the TFT 161 and is of transmission type. The pixel 60 has a pair of transparent insulating substrates 101,102 located to oppose each other. A TFT 161 and an auxiliary capacitance CS are located on the transparent insulating substrate 101; whereas a common electrode 105 is located on the transparent insulating substrate 102. Further, the pixel 60 has a liquid crystal layer 103 consisting of a liquid crystal filled between the substrates 101,102. The TFT 161 has a polycrystalline silicon film 106, as the active layer, formed on the transparent insulating substrate 101. A drain area 109 and a source area 110 are defined in the polycrystalline silicon film 106 at a predetermined interval. The drain area 109 and the source area 110 have low-concentration areas 109a,110a and high-concentration areas 109b, 110b,respectively. A gate insulation film 107 is formed on the polycrystalline silicon film 106 including the low-concentration areas 109a,110a. A gate electrode 108 is formed as the gate wiring $G_n$ on the gate insulation film 107. The drain area 109, source area 110, gate insulation film 107 and gate electrode 108 constitute the TFT 161.

The auxiliary capacitance CS is located near the TFT 161. Further, the auxiliary capacitance CS has a storage electrode 111 defined in the polycrystalline silicon film 106. This storage electrode 111 is connected to the source area 110 of the TFT 161. A dielectric film 112 is layered on the polycrystalline silicon film 106 in which the storage electrode 111 is defined. The dielectric film 112 is of the same material as the gate insulation film 107. A counter electrode 122 is disposed as the second electrode CSE2 of the auxiliary capacitance CS on the dielectric film 112. The counter electrode 122 is of the same material as the gate electrode 108. Insulation films 113 are applied on each side wall of the counter electrode 122 and of the gate electrode 108. Further, insulation films 114 are layered on the counter electrode 122 and the gate electrode 108, respectively.

An interlayer insulation film 115 is formed on the transparent insulating substrate 101 to shield the TFT 161 and the auxiliary capacitance CS. The interlayer insulation film 115 contains contact holes 117, 116 which communicate to the high-concentration area 110b of the source area 110 and to the high-concentration area 109b of the drain area 109, respectively. A source electrode 119, which is formed in the contact hole 117 and on the interlayer insulation film 115, is electrically connected to the high-concentration area 110b.

A drain electrode 118, which is formed in the contact hole 116 and on the interlayer insulation film 115, is electrically connected to the high-concentration area 109b. The source electrode 119 and the drain electrode 118 are spaced from each other. As the material of the drain electrode 118 and the source electrode 119, an aluminum alloy is generally used.

An insulation film 120 is formed over the entire surface of the substrate including the drain electrode 118, source electrode 119 and interlayer insulation film 115. This insulation film 120 contains a contact hole 121 communicating with the source electrode 119. A display electrode 104, which is formed on the insulation film 120 and in the contact hole 121, is electrically connected to the source electrode 119. The display electrode 104 opposes the common electrode 105. As the material of the display electrode 104, ITO (indium tin oxide) is generally used.

The auxiliary capacitance CS assumes a laminated structure in which the storage electrode 111, dielectric film 112 and counter electrode 122 are laminated in this order. A display electrode 104 having a step B is formed on the surface of this structure. This step B is formed between a first portion of the display electrode 104 located on the auxiliary capacitance CS and a flat-surface second portion C of the display electrode 104 formed on the insulation film 120. This step B has a cross-sectional profile conforming to the outline of the auxiliary capacitance CS and also has some degree of inclination angle $\theta$ with respect to the flat portion C. Accordingly, the liquid crystal layer 103 on the step B has a non-uniform thickness, and the liquid crystal molecules in the layer 103 are orientated non-uniformly. This makes it difficult to control light transmission and interception of the liquid crystal layer 103 employing the display electrode 104 resulting in a normally transmissive state. Accordingly, the step B constantly assumes the light transmissive state to bring about reduced contrast.

FIG. 4 shows a plan view of the pixel 60. FIG. 3 is the cross section taken along the line A—A in FIG. 4. In order to provide a clear view, some members shown in FIG. 3 are not depicted to conform with FIG. 4. As shown in FIG. 4, since the step B (hatching) is formed at a position including the center of the pixel 60, reduced contrast occurring at the step B is very noticeable. Therefore, the image quality of the LCD is greatly lowered. The portion of the display electrode 104 located at the step B has a small thickness, so that troubles, including an increase in the resistance and disconnection, are liable to occur.

Therefore, it has been suggested to interpose a planarizing film between the display electrode 104 and the interlayer insulation film 115 to allow the display electrode 104 to have a flat surface. For example, Japanese Unexamined Patent Publication No. 2-234134 discloses use of an SOG (Spin-On-Glass) film or an acrylic resin coating film as the planarizing film. Japanese Unexamined Patent Publication No. 4-31826 also discloses use of an SOG film as the planarizing film. The SOG film contains as a major component a solution of a silicon-containing compound dissolved in an organic solvent and silicon dioxide to be formed from the solution. The SOG film is formed by means of spin coating. According to the spin coating method, a solution of a silicon-containing compound dissolved in an organic solvent is dropped on a substrate, and then the substrate is rotated. The solution collects thick in recesses and thin at protrusions. Consequently, a film of the solution is thus formed such that the steps formed on the substrate by the wiring are compensated for. Thus, the film of the solution planarizes the surface of the display electrode 104. Next, the thus treated substrate is subjected to heat treatment to evaporate the organic solvent and promote polymerization reaction, giving an SOG film having a flat surface.

The SOG film includes inorganic SOG films and organic SOG films. The silicon-containing compounds in the inorganic SOG films contain no organic component, as represented by the general formula (1):

$$[SiO_2]_n \qquad (1)$$

and
the silicon-containing compounds in the organic SOG films contain organic components, as represented by the general formula (2):

$$[R_xSiO_y]_n \qquad (2)$$

In the above formulae, n, X and Y are integers; and R represents an alkyl group or an aryl group.

The inorganic SOG film not only contains water and hydroxyl groups in large amounts but also has high hygroscopicity. The inorganic SOG film further involves a disadvantage in that it is brittle compared with a silicon oxide film formed by CVD (Chemical Vapor Deposition) method and readily cracks during heat treatment if the film has a film thickness of 0.5 μm or more. Meanwhile, the organic SOG film has a molecular structure such that the linkage is partly blocked by an alkyl group or an aryl group. This controls cracking, which is liable to occur during heat treatment, so that an organic SOG film having a film thickness of about 0.5 to 1 μm can be formed. Accordingly, use of an organic SOG film enables not only formation of a thick interlayer insulation film, but also enables sufficient compensation of steps present on the substrate to give a planarized surface. However, the organic SOG film also contains some water and hydroxyl groups, although the content is small compared with the case of the inorganic SOG film, and shows high hygroscopicity. Further, the insulating properties and mechanical strength of the SOG film are lower than those of the silicon oxide film formed by CVD method. Accordingly, if an SOG film is interposed between the display electrode 104 and the interlayer insulation film 115, the water and hydroxyl groups contained in the SOG film are liable to affect the auxiliary capacitance CS, TFT 161, liquid crystal layer 103 and the wiring including drain electrode and source electrodes 118,119. For example, the water and hydroxyl groups are liable to cause deterioration in hot carrier resistance of the auxiliary capacitance CS and TFT 161 and also increase the resistance of the wiring 118,119 and their disconnection. Further, the SOG film is liable to absorb the water contained in the liquid crystal layer 3 to have an increased water content. In addition, the SOG film, having a low mechanical strength, brings about a reduction in the mechanical strength of the pixel portion 50 as a whole.

In Japanese Unexamined Patent Publication No. 4-31826, formation of a protective film on an invertedly staggered type TFT and formation of an SOG film on the protective film is disclosed. As the protective film, a silicon nitride film or silicon oxide film is employed, and such films are formed by means of CVD. This protective film prevents the water and hydroxyl groups contained in the SOG film from affecting the TFT and wiring, but the protective film cannot prevent them from affecting the liquid crystal layer. Further, the protective film cannot prevent the SOG film from absorbing the water contained in the liquid crystal layer leading to an increased water content.

The LCD unit for displaying color images should have RGB (red, green, blue) color filters, which are of three primary colors. For example, in a single-panel type liquid crystal projector LCD unit or direct vision LCD unit, every three pixels 60 in the pixel portion 50 are defined as a group. The three pixels 60 in each group may have RGB (red, green, blue) color filters respectively. In a three-panel type liquid crystal projector LCD unit employing three pixel portions 50 corresponding to the three primary colors RGB respectively, the pixel portions 50 each have any of the RBG color filters. In the three-panel type liquid crystal projector LCD unit, images projected from the respective pixel portions 50 are synthesized into one image.

FIG. 5 shows a schematic cross-sectional view of the pixel 60, having a color filter 162, in a prior art LCD. The color filter 162 is formed on a transparent insulating substrate 102, and the common electrode 105 for liquid crystal cells LC is layered on the color filter 162. As the material of the color filter 162, a synthetic resin is generally employed. The synthetic resin is colored with a dye or a pigment. As described above, when a color LCD unit is produced, an extra step of forming the color filter 162 on the transparent insulating substrate 102 is necessary, leading to complication of the production process compared with that of the monochrome LCD units.

SUMMARY OF THE INVENTION

Accordingly, it is a primary objective of the present invention to provide a display unit having display electrodes with flat surfaces in which the liquid crystal layer is affected little and to provide a process for producing the same.

It is a second objective of the present invention to provide a simplified process for producing a display unit having color filters.

It is a third objective of the present invention to provide a built-in driver type display unit having display electrodes with flat surfaces in which the liquid crystal layer is affected little and to provide a process for producing the same.

It is a fourth objective of the present invention to provide a simplified process for producing a built-in driver type display unit having color filters.

To achieve the foregoing and other objects and in accordance with the purpose of the present invention, an improved liquid crystal display unit is provided, which includes a first substrate, a second substrate opposing to the first substrate, pixel driving elements, first and second insulation layers, a planarizing film and a liquid crystal layer. The pixel driving elements are disposed on the first substrate and between the first and second substrates. The first insulation layer is deposited over the first substrate and the pixel driving elements. The planarizing film is formed on the first insulation layer. This planarizing film provides a substantially flat surface over the first substrate to minimize a height of a step present between the area corresponding to each pixel driving element and the area locating adjacent to the pixel driving element on the first substrate. The second insulation layer is formed on the planarizing film. The display electrodes are formed on the second insulation layer and electrically connected to the pixel driving elements, respectively. The liquid crystal layer is located between the first substrate and said second substrate.

The process for producing a liquid crystal display unit having a pixel portion containing pixel driving elements includes the steps of: A) forming the pixel driving elements on a substrate, B) forming a first insulation film over an entire surface of the substrate and over the pixel driving elements, C) forming a planarizing film to provide a substantially flat surface on the first insulation film, D) forming a second insulation film on the planarizing film, and E)

forming, on the second insulation film, display electrodes which are connected to the pixel driving elements respectively.

BRIEF DESCRIPTION OF THE DRAWINGS

The features of the present invention that are believed to be novel are set forth with particularity in the appended claims. The invention, together with the objects and advantages thereof, may best be understood by reference to the following description of the presently preferred embodiments taken in conjunction with the accompanying drawings in which:

DETAILED DESCRIPTION OF THE PREFERRED EMBODIMENTS

First Embodiment

Figure 1:
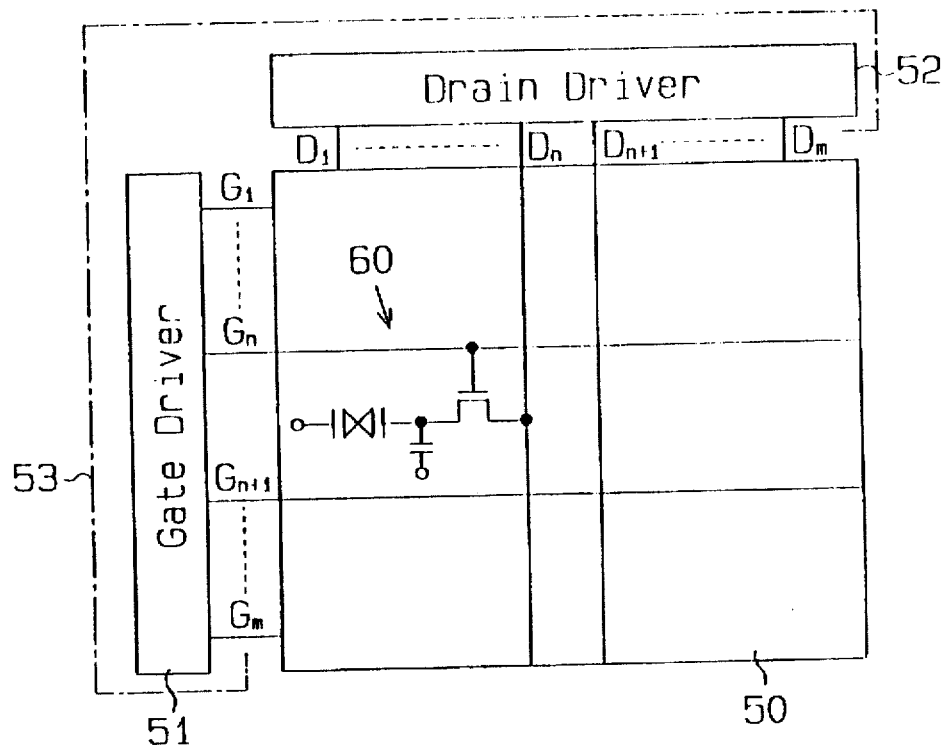
FIG. 1 is a block diagram of a prior art active matrix addressing mode LCD.
Figure 2:
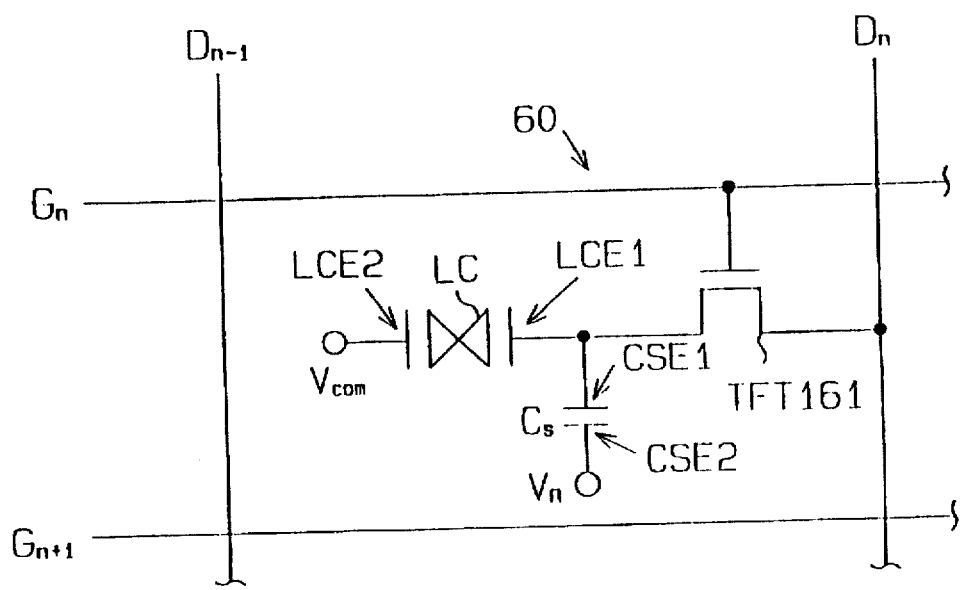
FIG. 2 is an equivalent circuit of a pixel shown in FIG. 1.
Figure 3:
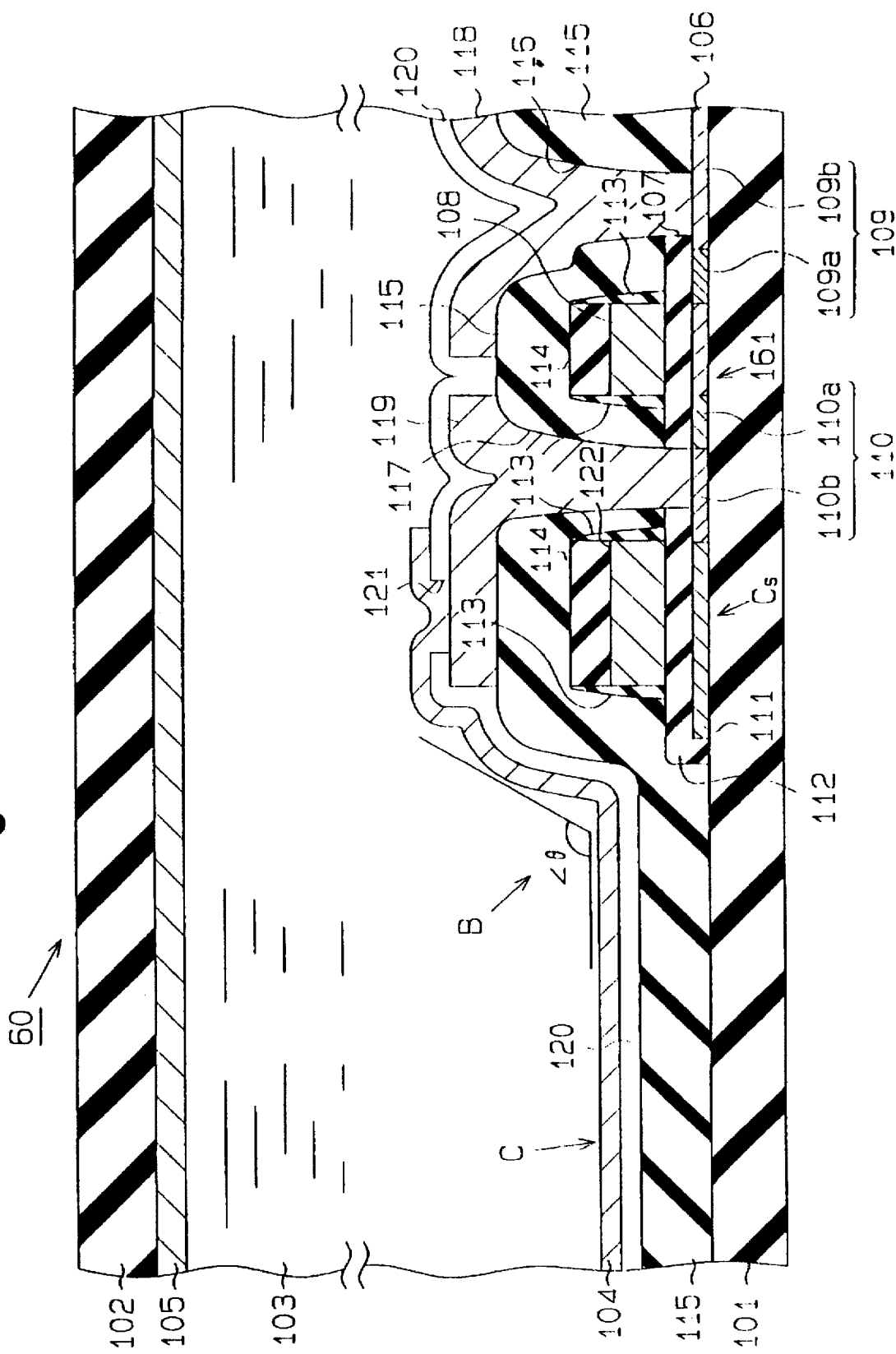
FIG. 3 is a schematic cross-sectional view of the pixel.
Figure 4:
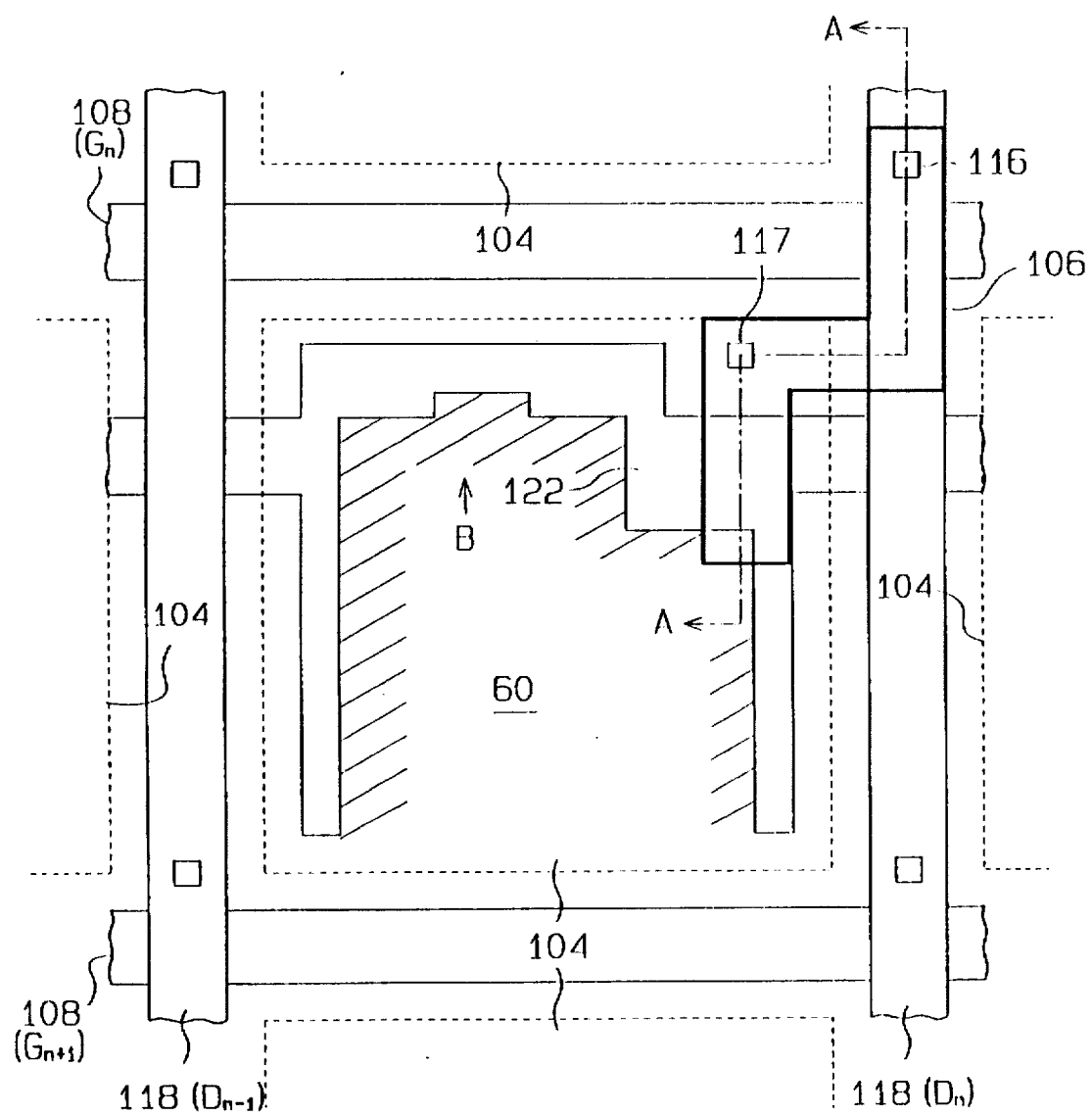
FIG. 4 is a plan view of the pixel of FIG. 3.
Figure 5:
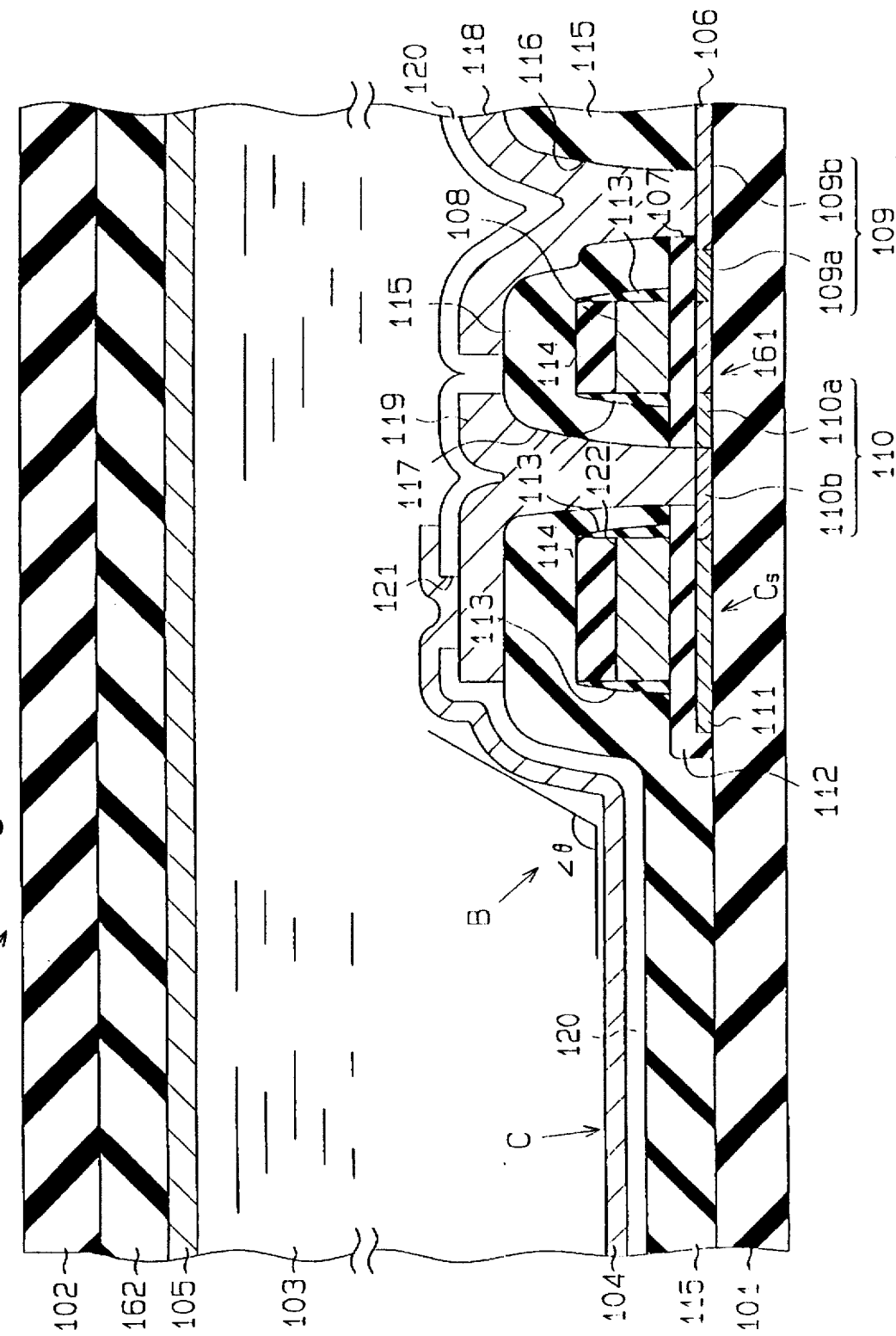
FIG. 5 is a schematic cross-sectional view of another prior art pixel.
Figure 6:
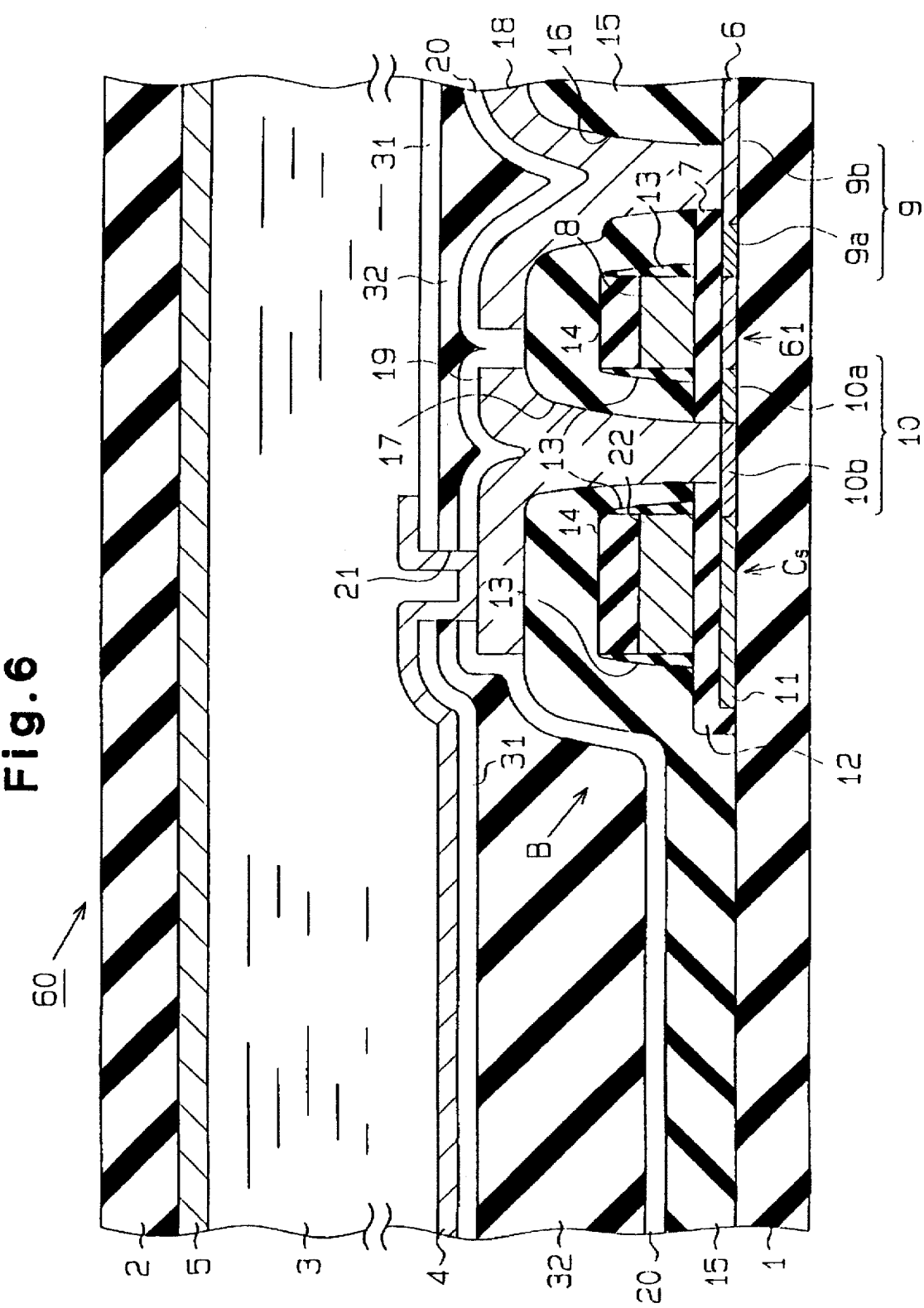
FIG. 6 is a schematic cross-sectional view of an LCD pixel according to a first embodiment and a second embodiment of the invention.

A first embodiment of the invention will be described referring to FIGS. 6 to 11. FIG. 6 shows a schematic cross-sectional view of a pixel 60 in an active matrix addressing mode LCD shown in FIG. 1. The pixel 60 has a TFT 61 which is a planar polycrystalline silicon TFT and is of the transmission type. The pixel 60 also has a pair of transparent insulating substrates 1,2 located to oppose each other. A TFT 61 and an auxiliary capacitance CS are formed on the transparent insulating substrate 1; whereas, a common electrode 5 is formed on the transparent insulating substrate 2. Further, the pixel 60 has a liquid crystal layer 3 consisting of a liquid crystal filled between the substrates 1,2. The TFT 61 has a polycrystalline silicon film 6, as the active layer, formed on the transparent insulating substrate 1. A drain area 9 and a source area 10 are defined in the polycrystalline silicon film 6 with a predetermined space being secured between them. The drain area 9 and the source area 10 have low-concentration areas 9a,10a and high-concentration areas 9b,10b, respectively. A gate insulation film 7 is formed on the polycrystalline silicon film 6 including the low-concentration areas 9a,10a. A gate electrode 8 is formed as the gate wiring on the gate insulation film 7. The drain area 9, source area 10, gate insulation film 7 and gate electrode 8 constitute the TFT 61. Accordingly, the TFT 61 is of the LDD (Lightly Doped Drain) structure in which the drain area 9 and the source area 10 have low-concentration areas 9a,10a and high-concentration areas 9b,10b, respectively.

The auxiliary capacitance CS is located near the TFT 61, and they are formed in the same step. The auxiliary capacitance CS has a storage electrode 11 defined in the polycrystalline silicon film 6. This storage electrode 11 is connected to the source area 10 of the TFT 61. A dielectric film 12 is layered on the polycrystalline silicon film 6 in which the storage electrode 11 is defined. The dielectric film 12 and the gate insulation film 7 are of the same material and are formed in the same step. A counter electrode 22 of the auxiliary capacitance CS is formed on the dielectric film 12. The counter electrode 22 and the gate electrode 8 are of the same material and are formed in the same step. Insulation films 13 are applied on each side wall of the counter electrode 22 and of the gate electrode 8, respectively. Further, insulation films 14 are layered on the counter electrode 22 and the gate electrode 8, respectively.

An interlayer insulation film 15 is formed on the transparent insulating substrate 1 to shield the TFT 61 and the auxiliary capacitance CS. The interlayer insulation film 15 contains contact holes 17,16 which communicate with the high-concentration area 10b of the source area 10 and with the high-concentration area 9b of the drain area 9, respectively. A source electrode 19, which is formed in the contact hole 17 and on the interlayer insulation film 15, is electrically connected to the high-concentration area 10b. A drain electrode 18, which is formed in the contact hole 16 and on the interlayer insulation film 15, is electrically connected to the high-concentration area 9b. The source electrode 19 and the drain electrode 18 are spaced from each other. As the material of the drain electrode 18 and the source electrode 19, an aluminum alloy is generally used. The electrodes 4,18,19 are generally formed by means of sputtering.

A first insulation film 20 having a film thickness of 1000 Å is formed on the entire surface of the substrate 1 including the drain electrode 18, source electrode 19 and interlayer insulation film 15. An SOG (Spin-On-Glass) film 32 is formed as a planarizing film on the first insulation film 20. This SOG film 32 cancels the recesses and protrusions formed on the first insulation film 20 due to the presence of the auxiliary capacitance CS and the TFT 61 to provide a flat surface. This SOG film 32 has a film thickness in the range of 5000 to 10000 Å at the recess including the step B. A second insulation film 31 having a film thickness of 1000 Å is formed on the SOG film 32. The first and second insulation films 20,31 and the SOG film 32 contain a contact hole 21 communicating with the source electrode 19. A display electrode 4, which is formed on the second insulation film and in the contact hole 21, is electrically connected to the source electrode 19. This display electrode 4 has a flat surface and opposes the common electrode 5. As the material of the display electrode 4, ITO (indium tin oxide) is generally used. That the display electrode 4 has a flat surface, as described above, permits uniform orientation of the liquid crystal molecules in the liquid crystal layer 3, and thus reduction of the contrast of the pixel 60 can be prevented. This promotes improvement of the image quality of the LCD. That the SOG film 32 has a flat surface facilitates formation of the display electrode 4 having a uniform thickness in the production process to be described later, and obviates problems such as increased resistance and disconnection.

The first and second insulation films 20,31 have the following properties:

(1) They have high insulating characteristics and mechanical strength;

(2) They contain no water and hydroxyl groups and block water and hydroxyl groups;

(3) They contain no substances which affect the auxiliary capacitance CS, TFT 61, liquid crystal layer 3 and wiring 18,19; and (4) They do not inhibit transmission of light.

The first and second insulation films 20,31 having such properties will be detailed in the production process to be described later. To employ a sandwich structure in which the SOG film 32 is sandwiched between the first and second insulation films 20,31 brings about the following actions and effects.

(1) These films 20,32,31 serve as an interlayer insulation film having high insulating property and mechanical strength. This enables the entire pixel portion 50 to have high mechanical strength;

(2) The first insulation film 20 located under the SOG film 32 prevents the water and hydroxyl groups contained in the SOG film 32 from affecting the auxiliary capacitance CS, TFT 61, and wiring 18,19; and (3) The second insulation film 31 located on the SOG film 32 prevents the water and hydroxyl groups contained in the SOG film 32 from affecting the liquid crystal layer 3 and also prevents the SOG film 32 from absorbing the water contained in the liquid crystal layer 3.

Production Process

Figure 7:
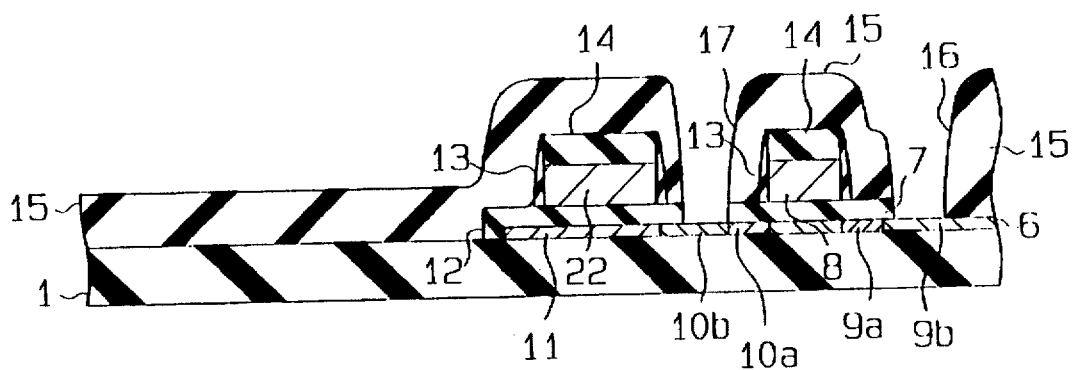
FIGS. 7 to 11 are schematic cross-sectional views for explaining a process for producing the LCD according to a first and second embodiments of the invention.

Step 1: As shown in FIG. 7, an undoped polycrystalline silicon film 6 having a film thickness of 500 Å is formed on a transparent insulating substrate 1 (quartz glass, high-heat resistance glass).

The polycrystalline silicon film 6 can be formed according to the following methods:

(1) CVD method and PVD (Physical Vapor Deposition) method In these methods, the polycrystalline silicon film 6 is directly formed. The CVD method includes atmospheric CVD, vacuum CVD, plasma CVD, ECR (Electron Cyclotron Resonance) plasma CVD and photo excited CVD. Meanwhile, the PVD method includes vapor deposition, EB (Electron Beam) vapor deposition, MBE (Molecular Beam Epitaxy) and sputtering. Of these methods, the vacuum CVD method resorting to pyrolysis of a monosilane ($SiH_4$) or a disilane ($Si_2H_6$) is generally employed. This method enables formation of a polycrystalline silicon film 6 of very high quality. In the vacuum CVD method, a treatment temperature of about 550° C. or below gives an amorphous silicon film, while a treatment temperature of about 620° C. or above gives a polycrystalline silicon film. The plasma CVD method resorting to pyrolysis of a monosilane or a disilane in plasma may be employed. The plasma CVD treatment is carried out at a temperature of about 300° C., and the reaction is accelerated by addition of hydrogen to form an amorphous silicon film. Addition of an inert gas (helium, neon, argon, krypton, xenon and radon) excites plasma to form a polycrystalline silicon film at any treatment temperature.

(2) Solid-phase growth method and fusion-recrystallization method

In these methods, the polycrystalline silicon film 6 is formed by forming an amorphous silicon film, followed by polycrystallization of the film. In the solid-phase growth method, the polycrystalline silicon film is formed by subjecting the amorphous silicon film to a heat treatment at about 600° C. for an extended time, e.g., about 20 hours to effect polycrystallization of the solid film as such. In the fusion-recrystallization method, only the surface of the amorphous silicon film is fused, and the thus fused silicon film is recrystallized while the temperature of the substrate is maintained at 600° C. or below. The latter method includes laser annealing and RTA (Rapid Thermal Annealing). In the laser annealing method, the amorphous silicon film is irradiated with a laser to heat-fuse the surface of the film. In the RTA method, the amorphous silicon film is irradiated with lamp light to heat-fuse the surface of the film. To maintain the substrate temperature to 600° C. or below in the solid-phase growth method or fusion-recrystallization method permits use of a high-heat resistance glass as the transparent insulating substrate. The cost of large quartz glass is extremely high, and the size of quartz glass cannot be increased limitlessly. This limits the substrate size. Accordingly, an economically reasonable panel size of the LCD will be No. 2 or below. This panel size is suitable for video camera view finders and for liquid crystal projector LCD's, but it is too small to be used in direct-view LCD's. On the other hand, the high-heat resistance glass costs about $\frac{1}{10}$ as much as the quartz glass and suffers no size limitation. Currently commercially available LCD high-heat resistance glass (e.g. No. 7059, Corning Inc., U.S.A.) has heat resistance of about 600° C. Accordingly, it is necessary to form a polycrystalline silicon TFT using a high heat-resistance glass as the transparent insulating substrate at a low temperature of about 600° C. or below (called low-temperature process). Incidentally, the process of fabricating a polycrystalline silicon TFT at a high temperature of about 1000° C. is called high-temperature process as opposed to the low-temperature process.

Next, a gate insulation film 7 and a dielectric film 12, both having a film thickness of 1000 Å, are simultaneously formed on the polycrystalline silicon film 6. The gate insulation film 7 and the dielectric film 12 can be formed according to the following methods:

[1] High-temperature oxidation methods (dry oxidation employing dry oxygen, wet oxidation employing wet oxygen and oxidation in a water vapor atmosphere); low-temperature oxidation methods (oxidation in a high-pressure water vapor atmosphere and oxidation in oxygen plasma); and anodizing method: A silicon oxide film is formed according to these oxidation methods.

[2] Deposition methods including CVD and PVD: A silicon oxide film, a silicon nitride film or a silicon nitride oxide ($SiO_xN_y$) film is formed by these methods. In this case, these films may be combined to constitute a multilayer structure. In the formation of a silicon oxide film by means of CVD, pyrolysis of a monosilane or a disilane, pyrolysis of an organic oxysilane such as TEOS (tetra-ethyl-orthosilicate or tetra-ethoxy-silane), or hydrolysis of a silicon halide is carried out. In the formation of a silicon nitride film by means of CVD, pyrolysis of ammonia and dichlorosilane ($SiH_2Cl_2$), that of ammonia and a monosilane, or that of nitrogen and a monosilane are carried out. The silicon nitride oxide film has both the properties of the oxide film and those of the nitride film, and can be formed by additionally using a small amount of nitrogen oxide ($N_2O$) in the CVD method.

Incidentally, there are a high-temperature process and a low-temperature process in forming the gate insulation film 7 and the dielectric film 12. As the high-temperature process, the high-temperature oxidation method described above is generally employed. Meanwhile, as the low-temperature process, the oxidation in oxygen plasma and the deposition methods described above can be employed, and the heat treatment can be carried out at about 600° C. or below.

Next, a resist pattern (not shown) is formed on the gate insulation film 7 only, excluding the dielectric film 12. Subsequently, a storage electrode 11 is defined in the polycrystalline silicon film 6 using the resist pattern as a mask. The storage electrode 11 is formed according to the high-temperature process or the low-temperature process. In the high-temperature process, the film 6 is subjected to ion implantation and then to a high-temperature heat treatment so as to activate the impurity. In the low-temperature process, the film 6 is subjected to irradiation of ion shower using a mixed gas of phosphine gas ($PH_3$) or diborane gas ($B_2H_6$) and hydrogen gas to effect implantation and activation of the impurity simultaneously without applying any extra heat treatment procedure. Incidentally, in the low-temperature process, a heat treatment may be occasionally carried out at a low temperature of about 600° C. or below for several hours to several tens of hours, after implantation of the impurity ion, so as to activate the impurity. In this case, since the resist pattern is provided on the gate insulation film 7, the portion of the polycrystalline silicon film 6 located under the gate insulation film 7 is not implanted with the impurity but remains undoped. This portion includes the source area 10, drain area 9 and the channel area between these areas 9 and 10.

Next, the resist pattern is removed, and then a gate electrode 8 and a counter electrode 22, both having a film thickness of 3000 Å, are simultaneously formed by patterning on the gate insulation film 7 and the dielectric film 12, respectively. Thus, the gate electrode 8 and the counter electrode 22 having the desired patterns can be formed. The gate electrode 8 and the counter electrode 22 are formed by means of CVD or PVD, and the material of these electrodes 8,22 includes doped polycrystalline silicon (doped polysilicon), metal silicide, polycide and high-melting metallic simple substance. Next, insulation films 14 are formed on the gate electrode 8 and the counter electrode 22. The insulation films 14 include silicon oxide films, silicon nitride films and silicon nitride oxide films, which are formed by means of CVD or PVD. Subsequently, low-concentration areas 9a,10a are defined according to the self-aligning technique in the polycrystalline silicon film 6 utilizing the insulation films 14 and the gate electrode 8 as masks. The low-concentration areas 9a,10a are defined in the same manner as the storage electrode 11 is defined, except that the concentration of the impurity to be implanted is low. The reason why the insulation films 14 are formed is to prevent the gate electrode 8 and the counter electrode 22 from being implanted with the impurity when the low concentration areas 9a,10a are defined. Particularly, resistance of these electrodes 8,22 is liable to be increased by the impurity implantation if they are formed of a doped polysilicon, and thus the insulating films 14 are indispensable.

Next, insulation films 13 are formed on the side walls of the gate electrode 8 and of the counter electrode 22, respectively. The material of the insulation film 13 is the same as that of the insulation film 14. The insulation films 13 are formed in the same manner as the insulation films 14 are formed. Subsequently, resist patterns (not shown) are formed on the insulation films 13,14, respectively. High concentration areas 9b,10b are defined in the polycrystalline silicon film 6 utilizing the resist patterns as masks. The high-concentration areas 9b,10b are defined in the same manner as the storage electrode 11 is defined. Then, the resist pattern is removed.

Next, an interlayer insulation film 15 is formed over the entire surface of the substrate. The interlayer insulation film 15 includes a silicon oxide film, a silicon nitride film, a silicon nitride oxide film and a silicate glass, which are formed by means of CVD or PVD. The interlayer insulation film 15 may be of a multilayer structure formed by combining these films. For example, suppose that an interlayer insulation film 15 consisting of a BPSG (boron-doped phosphosilicate glass) film sandwiched between a pair of undoped silicon oxide films (or NSG films) is formed. To carry out fusing after formation of the BPSG film allows the interlayer insulation film 15 to have an improved step covering property. This realizes, coupled with the planarization of the SOG film 32, a planarized display electrode 4.

Next, the interlayer insulation film 15 is partly removed by means of anisotropic etching at the portions locating on the high-concentration areas 9b,10b to form contact holes 16,17, respectively. Then, the substrate is exposed to hydrogen plasma to carry out hydrogenation of the polycrystalline silicon film 6. To bind hydrogen atoms to the crystal defects in the polycrystalline silicon film 6 by this hydrogenation treatment can reduce such defects and give a stable crystal structure and a high field effect mobility. Thus, a TFT 61 having improved element properties can be obtained.

Figure 8:
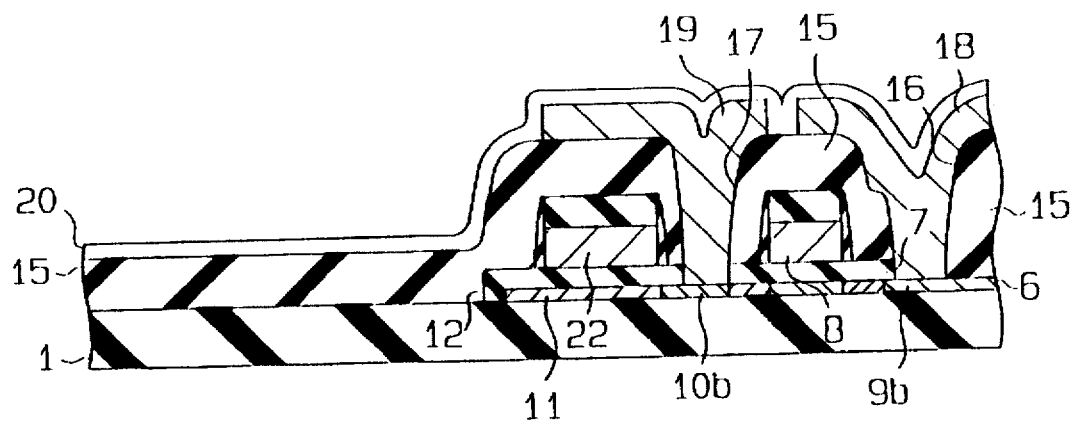

Step 2: As shown in FIG. 8, an aluminum alloy film (Al—Si(1%)—Cu(0.5%)) is formed over the entire surface of the substrate including the bores of the contact holes 16,17. Next, the aluminum alloy film is subjected to patterning to define a drain electrode 18 and a source electrode 19. The aluminum alloy film containing 1% of supersaturated silicon prevents silicon from migrating from the polycrystalline silicon film 6 to the drain electrode 18 and the source electrode 19. Further, the aluminum alloy film containing copper permits the drain electrode 18 and the source electrode 19 to have improved electromigration resistance and stress migration resistance. Subsequently, a first insulation film 20 is formed on the entire surface of the substrate. (The insulation film 20 will be described later).

Figure 9:
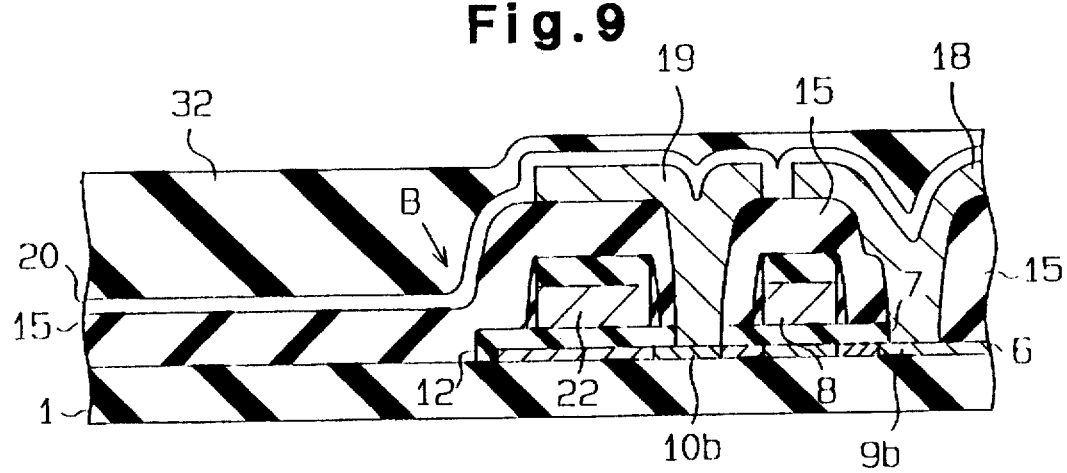

Step 3: As shown in FIG. 9, an SOG film 32 is applied on the first insulation film 20 by means of spin coating. As the SOG film 32, there is used an inorganic SOG film in which the silicon-containing compound contains no organic component as represented by the general formula: $[SiO_2]_n$, or an organic SOG film in which the silicon-containing compound contains an organic component as represented by the general formula: $[R_nSiO_y]$. In the above formulae, n, X and Y are integers; and R represents an alkyl group or an aryl group. In the spin coating method, a solution of such silicon-containing compound in ethanol is dropped onto a transparent insulating substrate 1, and then the substrate is rotated at 4800 rpm for 20 seconds. A film of the solution is thus formed such that the solution may collect thickly in recesses including the step B present on the substrate 1 and thinly at protrusions. Thus, the steps are canceled, and a film of the ethanol solution having a flat surface is formed. Next, the thus treated substrate is subjected to heat treatment under atmospheric condition to evaporate the ethanol contained in the film and promote polymerization reaction giving an SOG film 32 having a substantially planar surface. The heat treatment is preferably carried out at 80° C. for one minute, at 150° C. for one minute and at 200° C. for one minute. The formation of the film of the ethanol solution and heat treatment thereof are repeated a few times (three times in this embodiment), and finally the thus treated substrate is subjected to a heat treatment in a nitrogen atmosphere at 370° C. for 30 minutes to give an SOG film 32 having a desired film thickness. Incidentally, the heat treatment may be alternatively carried out in a nitrogen atmosphere at 100° C. for one minute, at 200° C. for one minute, at 300° C. for one minute, at 22° C. for one minute and at 300° C. for 30 minutes.

Figure 10:
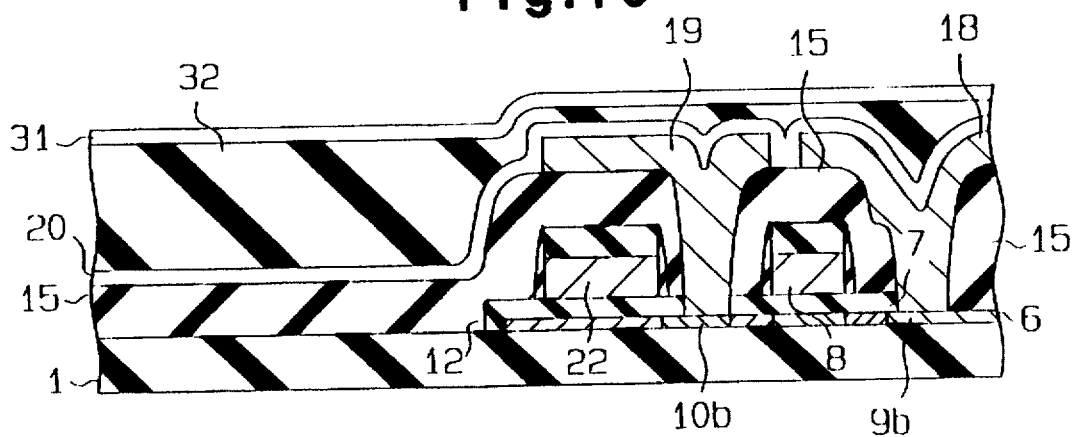

Step 4: As shown in FIG. 10, a second insulation film 31 is formed on the SOG film 32 by means of plasma CVD. As the first and second insulation films 20,31, silicon oxide films, silicon nitride films and silicon nitride oxide films can be employed. Particularly, TEOS films (plasma TEOS films) and silicon oxide films (plasma oxide films), both formed by means of plasma CVD method, as well as, silicon oxide films formed by means of ECR plasma CVD contain no water and hydroxyl groups and also have a property of blocking water and hydroxyl groups. The reason why these films inhibit water permeation is that the dangling bonds in the film are supposed to capture water. In addition to this supposition, it is surmised that the Si—H bonds in the film capture water. The plasma TEOS film and the plasma oxide film have poor water permeation blocking performance compared with the ECR oxide film. In order to improve this performance, the plasma TEOS film and the plasma oxide film are preferably implanted on the surface with various ionic species. Thus, the ion-implanted areas in the films are allowed to have many dangling bonds. These dangling bonds capture water to inhibit permeation of the water. Accordingly, the plasma TEOS film and the plasma oxide film, having such ion-implanted areas, come to have extremely high water permeation blocking performance. In addition, to provide such ion-implanted areas in the TEOS film and the plasma oxide film enables them to have sufficient water permeation blocking performance in spite of their small film thickness. Accordingly, the first and second insulation films 20,31, both having a small film thickness, prevent the contact hole 21 from having a high aspect ratio.

The ion to be implanted into the plasma TEOS film and the plasma oxide film typically includes silicon ion, inert gas ions, arsenic ion and phosphorus ion. These ions have a relatively great mass to facilitate formation of dangling bonds in the plasma TEOS film and the plasma oxide film. Further, these ions do not affect the auxiliary capacitance CS, TFT 61, liquid crystal layer 3 and wirings 18,19. Incidentally, hydrogen ion and helium ion among the inert gas ions are not appropriate because of their small mass, but argon ion is suitable because ion implantation is facile. The ion implantation is desirably carried out with an implantation energy of 10 to 150 KeV and at a dose of about $1\times10^{16}$ to $1\times10^{17}$ cm$^{-2}$. These conditions vary depending on the ionic species employed and the thickness of the plasma TEOS film or the plasma oxide film. The smaller the implantation energy, the better, in view of damage that the plasma TEOS film or the plasma oxide film may undergo. Incidentally, when a small implantation energy is employed, the dose should be increased.

As another technique of improving water permeation blocking performance of the plasma TEOS film or the plasma oxide film, the surface of the film may be subjected to hydrogen plasma treatment. This provides many Si—H bonds in the hydrogen plasma-treated areas. The Si—H bonds capture water to inhibit permeation of the water. This enables the plasma TEOS film and the plasma oxide film to have extremely high water permeation blocking performance. In addition, to provide such hydrogen plasma-treated areas in these films in the TEOS film and the plasma oxide film enables them to have sufficient water permeation blocking performance in spite of their small film thickness. Accordingly, the first and second insulation films 20,31, both having-small film thickness, prevent the contact holes 21 from having a high aspect ratio.

The gas employable for the plasma oxide film formation includes, for example, monosilane and nitrogen suboxide ($SiH_4+N_2O$), monosilane and oxygen ($SiH_4+O_2$), and TEOS and oxygen ($TEOS+O_2$). When such gas is employed, the plasma oxide film is formed at a temperature of 300° to 900° C.

Figure 11:
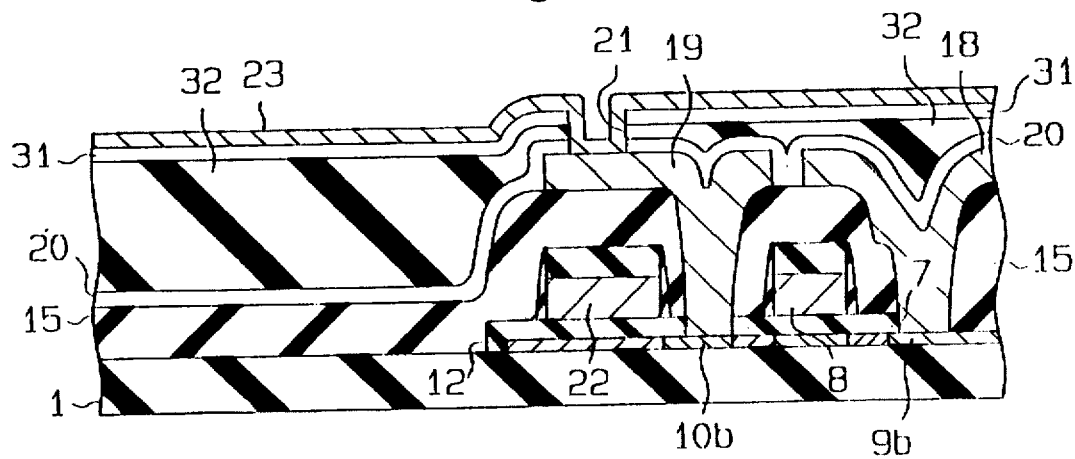

Step 5: As shown in FIG. 11, the SOG film 32 and the first and second insulation films 20,31 locating on the source electrode 19 are partly removed by means of anisotropic etching to form a contact hole 21. Then, an indium tin oxide (ITO) film 23 is formed on the second insulation film 31 including the bore of the contact hole 21 by means of sputtering.

Step 6: As shown in FIG. 6, the ITO film 23 is subjected to patterning to provide a display electrode 4 (film thickness: 2000 Å) having a desired profile. Next, the transparent insulating substrate 1 having the TFT 61 and the auxiliary capacitance CS, formed according to the production process described above, is opposed to a transparent insulating substrate 2 on which a common electrode 5 is formed, and a liquid crystal is sealed between these substrates 1,2 to form a liquid crystal layer 3 completing a pixel portion 50 of the LCD.

When a high-heat resistance glass is used as the transparent insulating substrate 1, the entire process starting from the formation of the polycrystalline silicon film 6 to the formation of the display electrode 4 should be carried out according to the low-temperature process. Accordingly, the first and second insulation films 20,31 are suitably formed by means of plasma CVD, ECR plasma CVD, photo excited CVD or PVD, which use low treatment temperatures.

The source area 10 is connected to the display electrode 4 via the source electrode 19. This permits the source area 10 and the display electrode 4 to assume ohmic contact with each other. If the source electrode 19 is omitted, the source area 10 defined in the polycrystalline silicon film 6 and the ITO display electrode 4 are directly connected. This produces heterojunction between the source area 10 and the display electrode 4. This heterojunction brings about band gap-oriented energy gap, resulting in the failure of providing excellent ohmic contact. This makes it difficult to correctly write data signals applied to the drain wiring $D_n$ in pixels 60 and lowers the image quality of the LCD unit.

Second Embodiment

The LCD pixels 60 according to a second embodiment each contain a colored SOG film 32, which serves not only as the planarizing film but also as a color filter. Three methods of coloring the SOG film 32 are shown below:

(1) The SOG film 32 is formed and then colored with a dye;

(2) A dye or a pigment is dispersed in a solution of a silicon-containing compound in ethanol. The silicon-containing compound is of a composition represented by the general formula: $[SiO_2]_n$ or $[R_xSiO_y]_n$. The resulting ethanol solution is applied on a transparent insulating substrate 1 by means of spin coating, followed by the same heat treatment as in Step 3; and (3) The SOG film 32 is formed, and then a pigment-dispersed ink is printed on the surface of the film 32.

As described above, the steps of coloring the SOG film 32 are all very simple and do not complicate the step of forming the SOG film 32. This can provide a simplified production process compared with that of the prior art LCD's having color filters.

When the second embodiment of the invention is applied to a single-panel type liquid crystal projector LCD unit or a direct-view LCD unit, the SOG film 32 is fabricated as follows. Every three pixels 60 in the pixel portion 50 are defined as a group. A colored SOG film 32 is formed such that the SOG film 32 of the three pixels 60 in each group may serve as RGB (red, green, blue) color filters respectively. Meanwhile, when the second embodiment of the invention is applied to a three-panel type liquid crystal projector LCD, colored SOG films 32 are formed such that the SOG films 32 of the three pixel portions 50 may serve as three RGB color filters respectively.

As described above, according to the second embodiment of the invention, the same actions and effects can be obtained as in the first embodiment. The second embodiment, consisting of the production steps of the first embodiment plus the step of coloring the SOG film 32, permits use of the SOG film 32 not only as a planarizing film but also as a color filter. Further, in the second embodiment, the production process is not complicated, and the color filters can be produced easily.

Third Embodiment

Figure 12A:
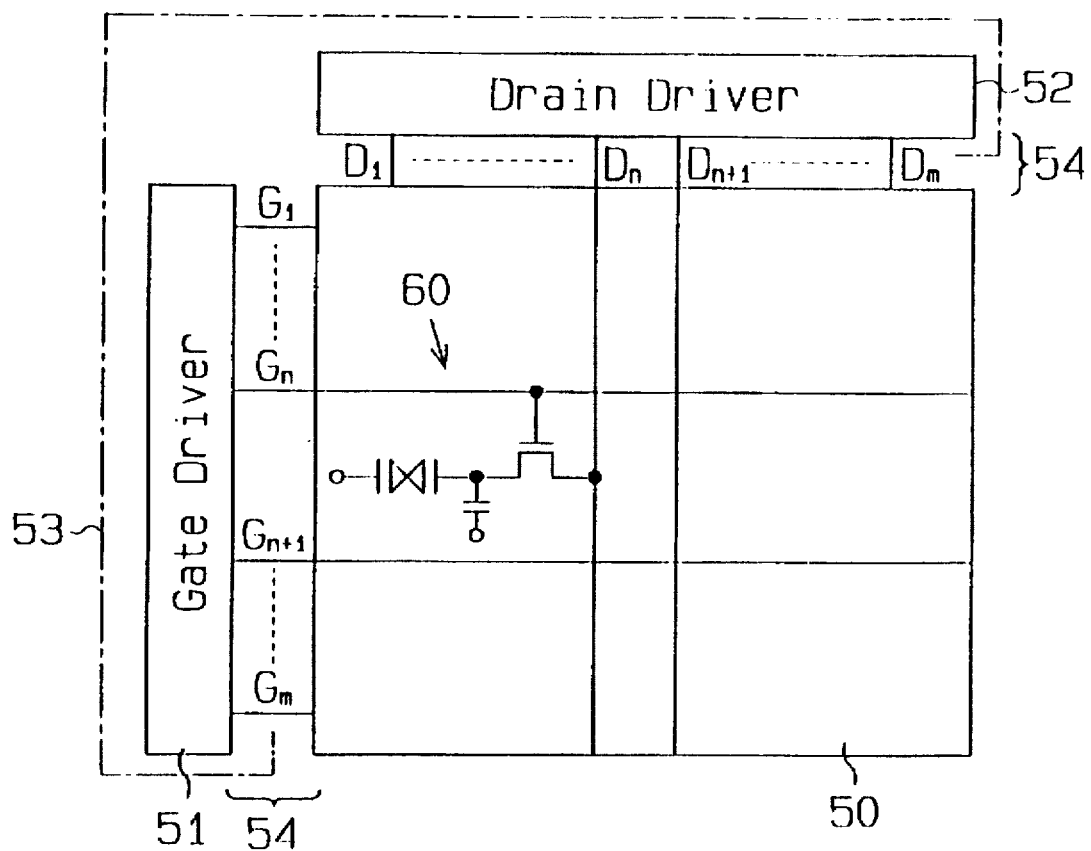
FIG. 12A is a block diagram of built-in driver type LCD unit according to a third embodiment of the invention.
Figure 12B:
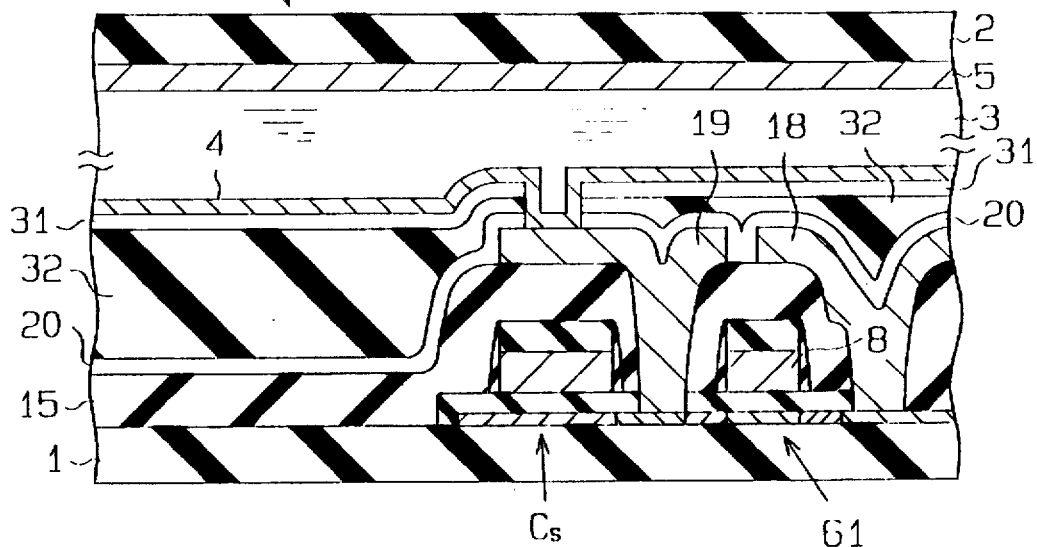
FIGS. 12B, 12C and 12D are schematic cross-sectional views of an LCD unit of FIG. 12A.
Figure 12C:
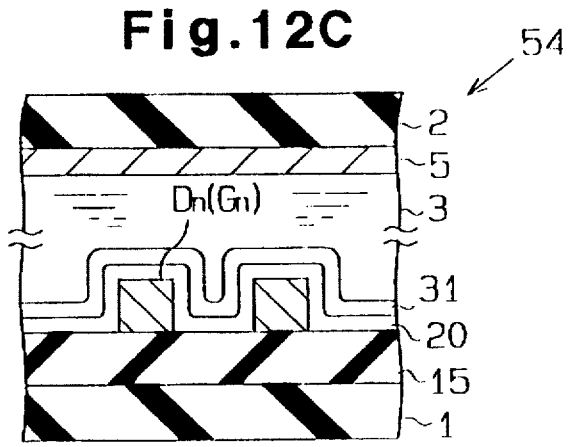
Figure 12D:
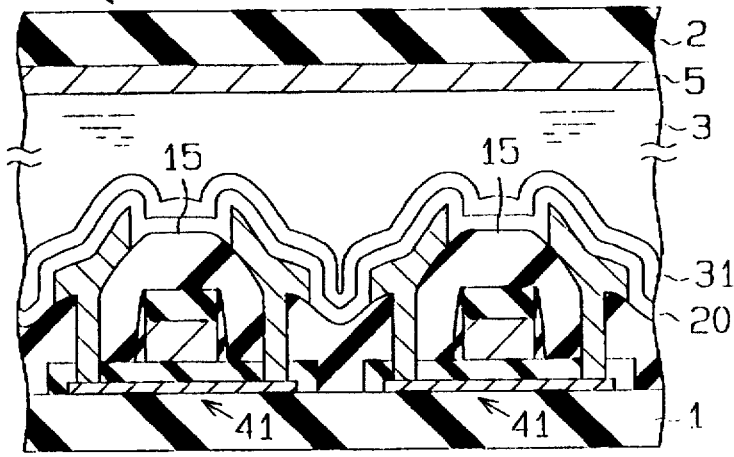

In a third embodiment, the same components as used in the first embodiment are affixed with the same reference numbers, and detailed description of them will be omitted. FIG. 12B shows a schematic cross-sectional view of a pixel 60 in a built-in driver type transmission LCD unit as shown in FIG. 12A. FIG. 12C is a schematic cross-sectional view of a wiring portion 54 disposed between a pixel portion 50 and a peripheral driving circuit 53 and connecting them to each other. FIG. 12D is a schematic cross-sectional view of the peripheral driving circuit 53.

As shown in FIG. 12C, gate wirings $G_n$ and drain wirings $D_n$ (only drain wirings are shown in FIG. 12C) are located on an interlayer insulation film 15. The gate wirings Gn are connected to gate electrodes 8 of TFT's 61. The drain wirings $D_n$ are formed in the same step as drain electrodes 18 are formed. As shown in FIG. 12D, the peripheral driving circuit 53 has a plurality of planar polycrystalline silicon TFT's 41 formed on a transparent insulating substrate 1. These TFT's 41 assume an LDD (lightly doped drain) structure and are connected to the gate wirings $G_n$ and drain wirings $D_n$. On the substrate 1, a first insulation film 20 and a second insulation film 31 are layered on the wiring portion 54 including the wirings $G_n, D_n$ and on the area where the peripheral driving circuit 53 including TFT's 41 is formed.

As described above, in this embodiment, no SOG film 32 is present on the wiring portion 54 locating between the pixel portion 50 and the peripheral driving circuit 53 nor on the area of the substrate 1 where the peripheral driving circuit 53 is disposed. This SOG film 32 is necessary, for forming display electrodes 4 having flat surfaces in the pixel portion 50. Accordingly, no SOG film 32 is required on the wiring portion 54 and the peripheral driving circuit 53. If the SOG film 32 is present on the wiring portion 54 and on the peripheral driving circuit 53, the water and hydroxyl groups contained in the film 32 are liable to affect the wirings $G_n, D_n$ and TFT's 41. For example, such water and hydroxyl groups deteriorate hot carrier resistance of the TFT's 41. Further, it can happen that the wirings $G_n, D_n$ are oxidized to have increased resistance or undergo disconnection.

Use of a peripheral driving circuit 53 having a high operational speed enables realization of a high-image quality LCD unit. In order to obtain such high-operational speed peripheral driving circuit 53, the TFT's 41 should have a high hot carrier resistance over the TFT's 61 in the pixels 60. The TFT 41 having the hot carrier resistance is particularly susceptible to water and hydroxyl groups compared with the TFT 61. Since no SOG film 32 is formed on the peripheral driving circuit 53 in this embodiment, the water and hydroxyl groups contained in the film 32 are prevented from deteriorating hot carrier resistance of the TFT's 41, thus giving a high-operational speed peripheral driving circuit 53.

Japanese Unexamined Patent Publication Nos. Hei 2-234134 and Hei 4-31826, which are incorporated herein as prior art references, disclose no built-in driver type LCD, nor do they disclose a technique of providing a planarizing film on the wiring portion 54 and the peripheral driving circuit 53.

As described above, the same actions and effects as in the first embodiment can be exhibited in the third embodiment. Further, a high-operation speed peripheral driving circuit 53 can be obtained according to this embodiment. In other words, the peripheral driving circuit 53 remains unaffected and shows excellent electrical properties. This allows the pixel portion 50 to have excellent optical properties, giving a high-image quality built-in driver type LCD.

First Production Process

A first production process according to the third embodiment will be described referring to FIGS. 7, 8, 13A to 13C, 14A to 14C and 15A to 15C, in which A, B and C have the same meanings as described with respect to FIGS. 12B, 12C and 12D, respectively.

Step 1: As shown in FIG. 7, the procedures of Step 1 in the first embodiment are repeated starting from the formation of the polycrystalline silicon film 6 to the formation of the contact holes 16,17. Gate wirings $G_n$ in the wiring portion 54 are formed in the same manner as the gate electrodes 8 are formed in accordance with Step 1 of the first embodiment. Further, TFT's 41 of the peripheral driving circuit 53 and TFT's 61 are formed simultaneously on the substrate 1.

Step 2: As shown in FIG. 8, drain electrodes 18 and source electrodes 19 in the pixels 60 are formed in accordance with Step 2 of the first embodiment. In this step, drain wirings $D_n$ in the wiring portion 54 are formed simultaneously. Next, a first insulation film 20 is formed over the entire surface of the substrate 1 including the pixel portion 50, the wiring portion 54 between the pixel portion 50 and the peripheral driving circuit 53, and the peripheral driving circuit 53.

Figure 13A:
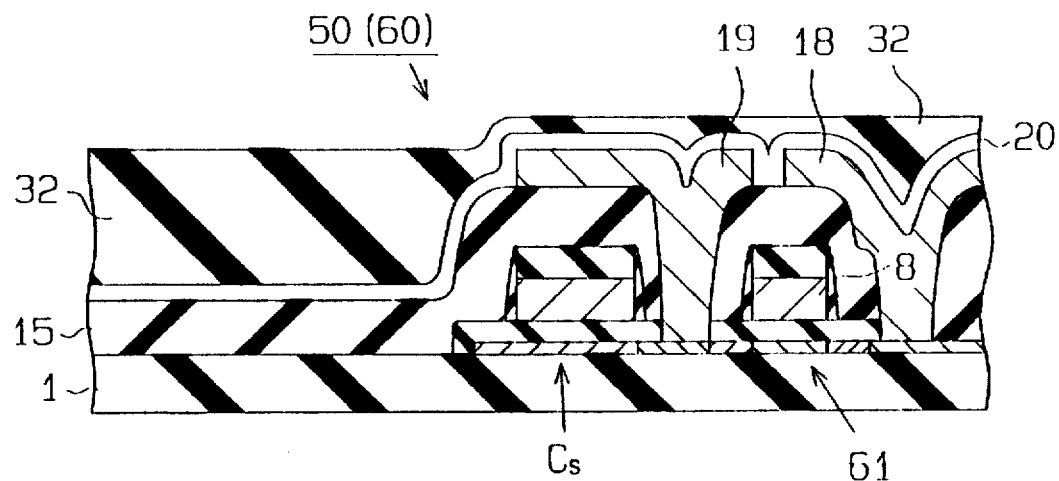
FIGS. 13A, 13B, 13C, 14A, 14B, 14C, 15A, 15B and 15C are schematic cross-sectional views for explaining a first process for producing the LCD according to the third embodiment of the invention.
Figure 13B:
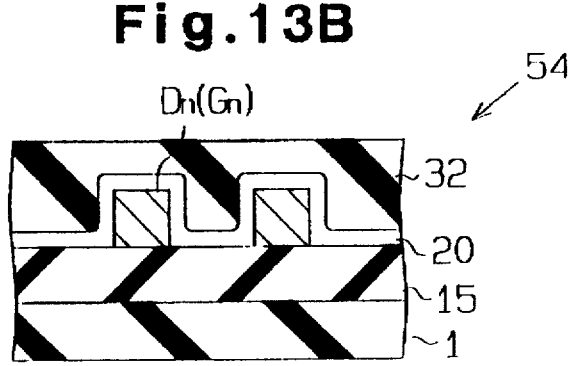
Figure 13C:
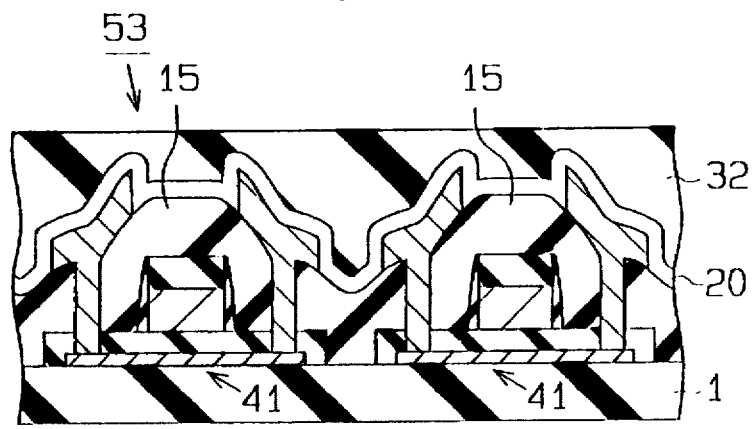

Step 3: As shown in FIGS. 13A, 13B and 13C, an SOG film 32 is formed on the first insulation film 20 over the entire surface of the substrate 1. The SOG film 32 is formed in the same manner as in the first embodiment.

Figure 14A:
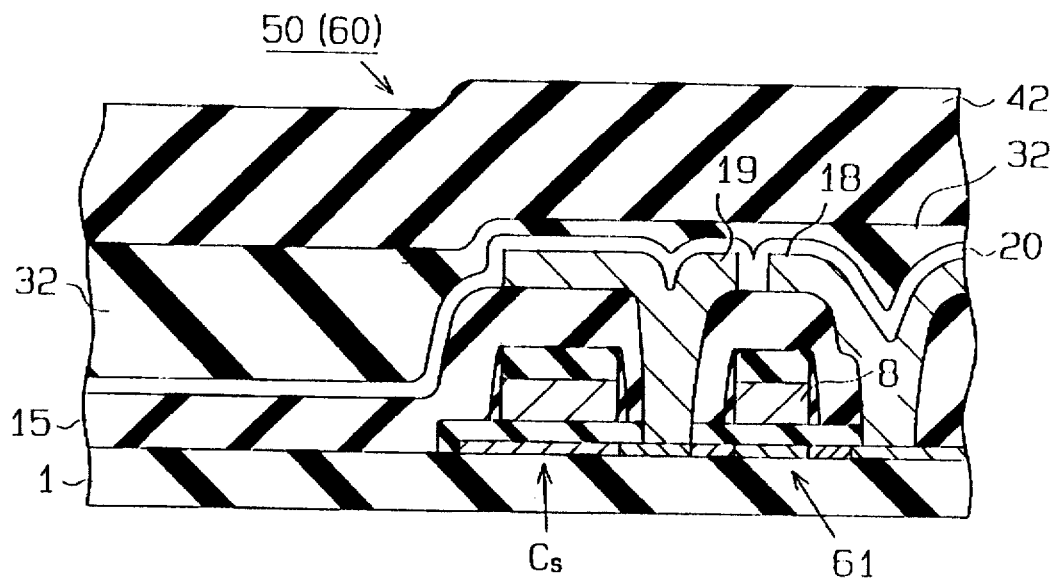
Figure 14B:
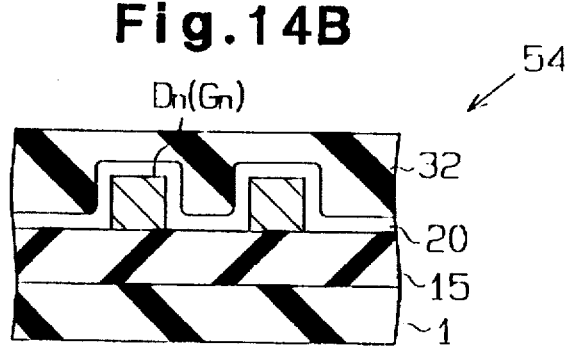
Figure 14C:
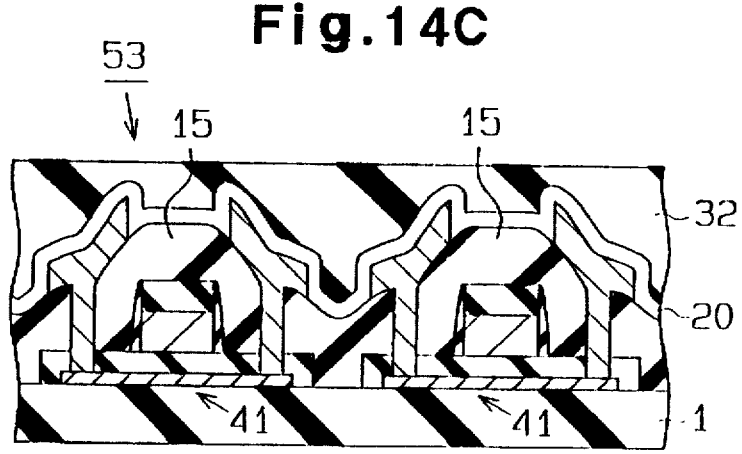

Step 4: As shown in FIGS. 14A, 14B and 14C, a resist pattern 42 is formed on the area of the SOG film 32 covering the pixel portion 50.

Figure 15A:
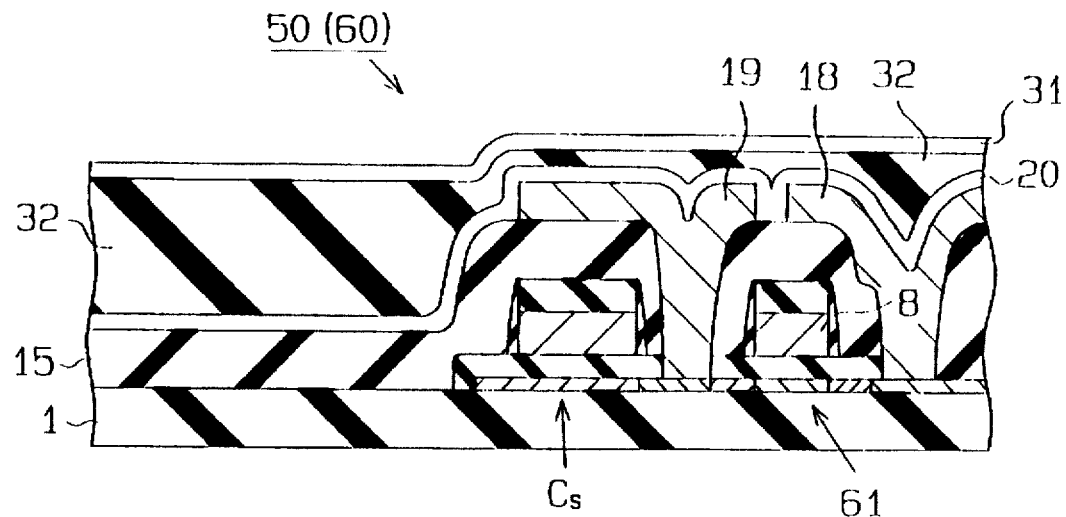
Figure 15B:
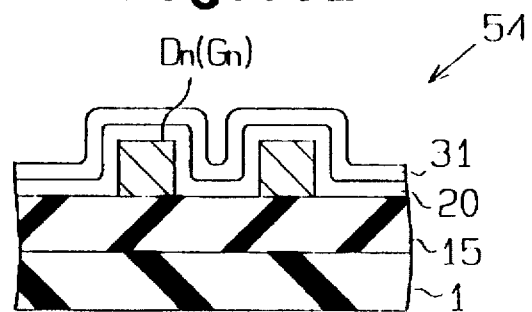
Figure 15C:
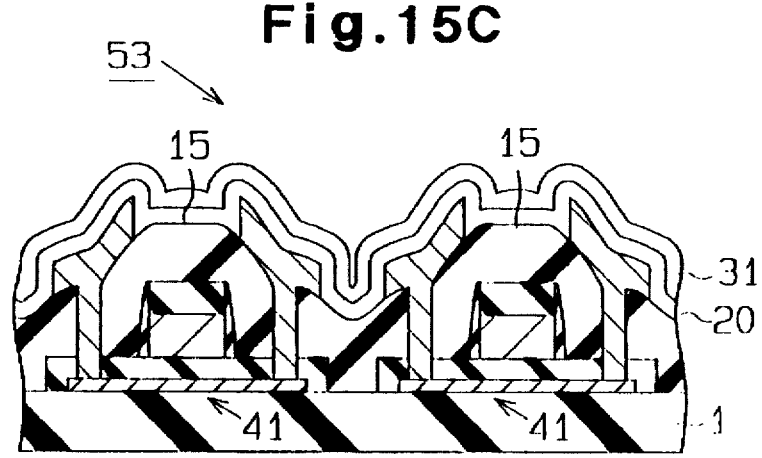

Step 5: As shown in FIGS. 15A, 15B and 15C, the substrate 1 is subjected to etching using the resist pattern 42 as an etching mask to remove the SOG film 32 covering the wiring portion and the peripheral driving circuit 53. Thus, the SOG film 32 remains on the pixel portion 50 only but not on the wiring portion and the peripheral driving circuit 53. Next, a second insulation film 31 is formed over the entire surface of the substrate 1, followed by the same treatments as in Steps 5 and 6 of the first embodiment, to obtain an LCD.

Second Production Process

A second production process according to the third embodiment will be described referring to FIGS. 16A to 16C and FIGS. 17A to 17C.

Step 1: The procedures of Step 1 in the first embodiment are repeated analogously.

Step 2: The procedures of Step 2 in the first embodiment are repeated analogously.

Figure 16A:
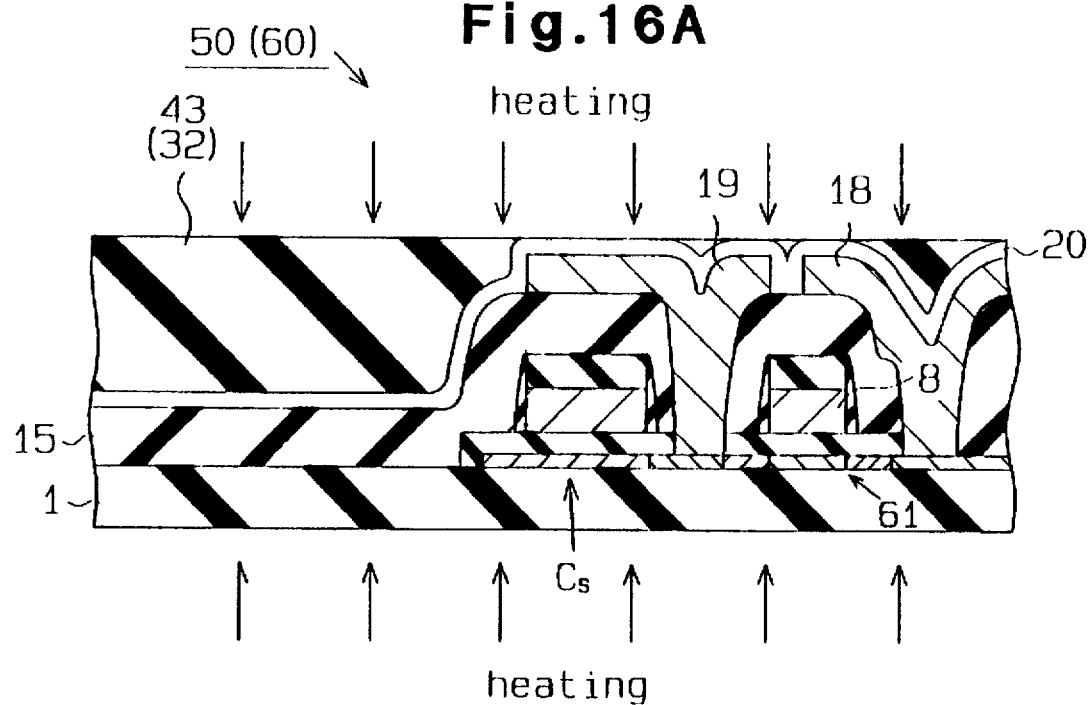
FIGS. 16A, 16B, 16C, 17A, 17B and 17C are schematic cross-sectional views of the LCD unit for explaining a second process for producing the LCD according to the third embodiment.
Figure 16B:
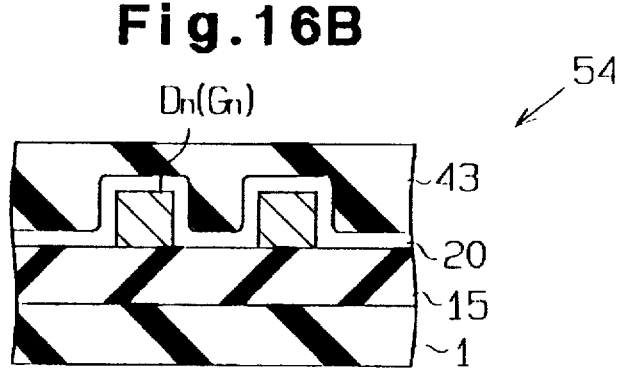
Figure 16C:
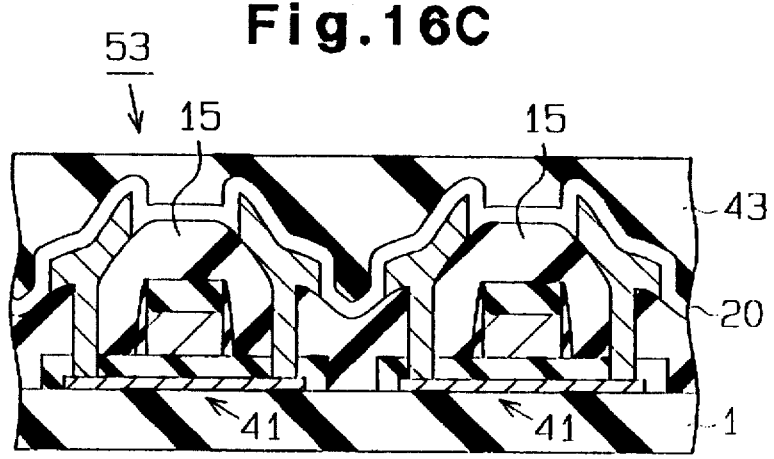

Step 3: As shown in FIGS. 16A, 16B and 16C, a solution of a silicon-containing compound in ethanol is applied by means of spin coating on the first insulation film 20 formed over the entire surface of the substrate 1 to form a coating film 43. The silicon-containing compound is of a composition represented by the general formula $[SiO_2]_n$ or $[RxSiO_y]_n$. Next, the substrate 1 is exposed to the atmosphere, and only a first area of the coating film 43 covering the pixel portion 50 is subjected to a primary heat treatment and then to a secondary heat treatment in a nitrogen atmosphere. The primary heat treatment is preferably carried out stepwise at 80° C. for one minute, at 150° C. for one minute and at 200° C. for one minute. The secondary heat treatment is preferably carried out at 370° C. for 30 minutes. It is preferred to use the RTA (rapid thermal annealing) method to carry out partial heat treatment. As described above, the formation of the coating film 43 and the heat treatments are repeated several times to evaporate the ethanol in the coating film 43 and to accelerate the polymerization reaction, forming an SOG film 32 having a substantially flat surface only within the first area corresponding to the pixel portion 50. In this step, no heat treatment is applied to a second area of the coating film 43 covering the wiring portion and the peripheral driving circuit 53. Accordingly, the coating film 43 in the second area is not cured to form an SOG film 32. Incidentally, the primary heat treatment may be alternatively carried out at 100° C. for one minute, at 200° C. for one minute and at 300° C. for one minute in a nitrogen atmosphere. The secondary heat treatment may be alternatively carried out at 22° C. for one minute and at 300° C. for 30 minutes in a nitrogen atmosphere.

Figure 17A:
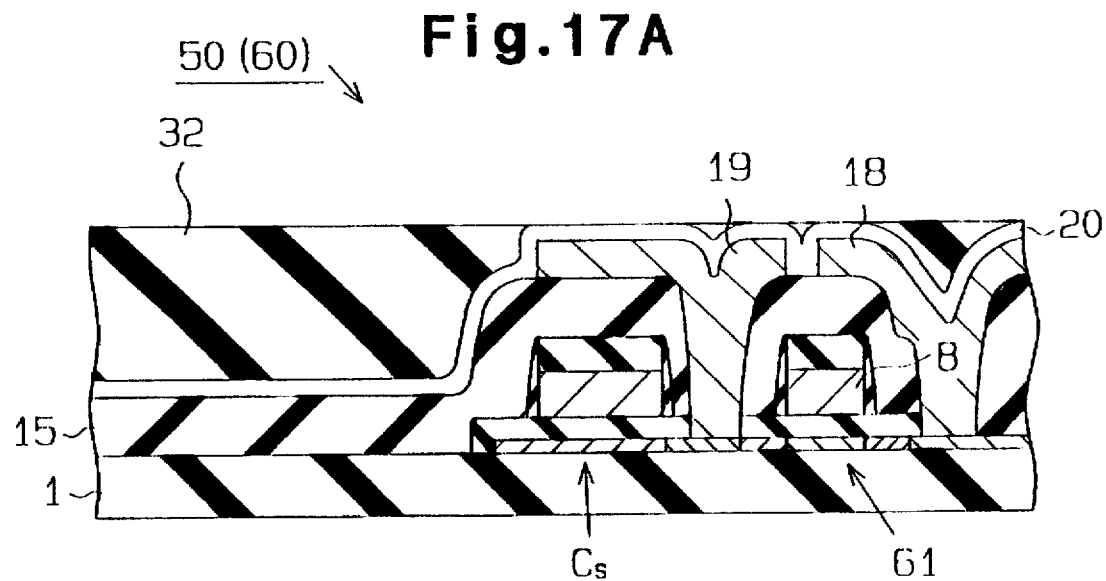
Figure 17B:
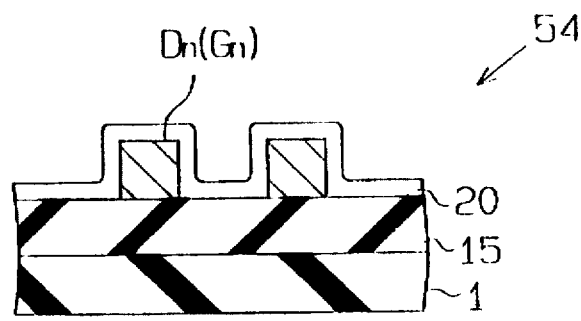
Figure 17C:
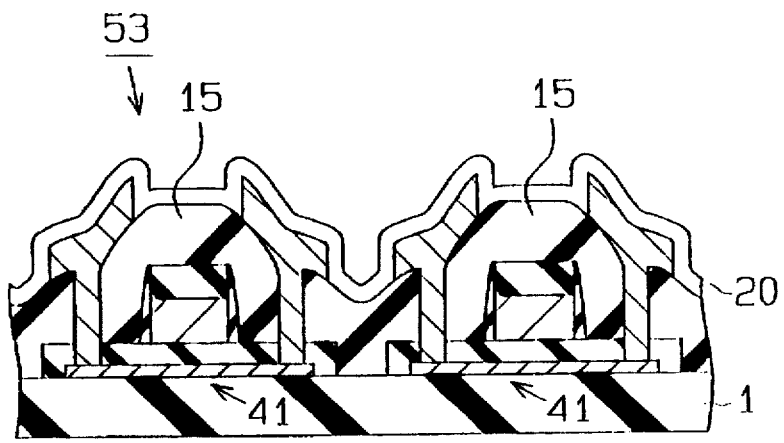

Step 4: As shown in FIGS. 17A, 17B and 17C, the coating film 43 in the second area is rinsed off using ethanol or the like.

Thus, the SOG film 32 is formed on the pixel portion 50 only and not on the wiring portion and the peripheral driving circuit 53. Then, the procedures of Steps 5 and 6 of the first embodiment are repeated analogously to give an LCD.

Although three embodiments of the present invention have been described herein, it should be apparent to those skilled in the art that the present invention may be embodied in many other specific forms without departing from the spirit or scope of the invention. Particularly, it should be understood that the present invention may be embodied in the following manners:

When an organic SOG film is used as the SOG film 32, the SOG film 32 may be subjected to oxygen plasma treatment. Thus, the C—Si bonds in the organic SOG film are converted to Si—O—Si bonds, and the organic component contained in the organic SOG film is decomposed to provide improved film quality. The organic SOG film containing an organic component is greatly etched as compared with the first and second insulation films 20,31 due to the water it contains and oxygen supplied from the first insulation film 20. Further, in the ashing treatment of removing the photo-resist used as the etching mask, the organic component contained in the organic SOG film is decomposed. Thus, the organic SOG film shrinks to retract and form recesses. Presence of such recesses makes it difficult to fully fill contact holes 21 with an ITO film 23 when it is formed, resulting in the failure good contact. However, in any of the foregoing embodiments, the step B has a big gap, so that the SOG film 32 collects thickly in the recesses and thinly at the protrusions. The contact holes 21 are formed at the thin portions of the SOG film 32. Accordingly, there is substantially no likelihood of forming recesses in the holes 21 even if the organic SOG film is not subjected to oxygen plasma treatment. Therefore, plasma treatment is not particularly required except the cases where high reliability is required.

Figure 18:
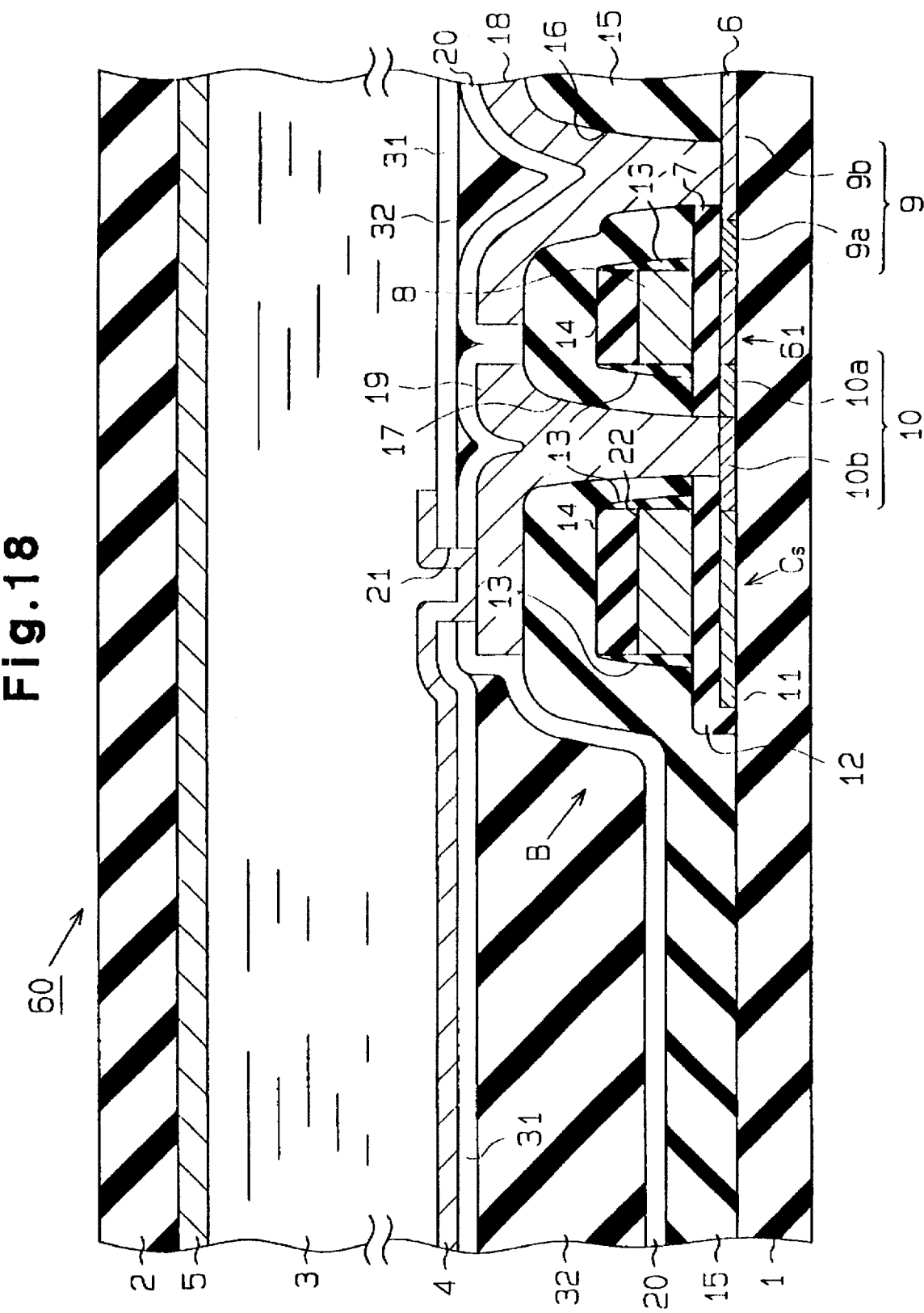
FIG. 18 is a schematic cross-sectional view of the LCD pixel according to another embodiment of the invention.

After the SOG film 32 is formed, it may be etched back. The increased water content and hydroxyl groups in the SOG film 32 cause defects including poisoned via. Poisoned via refers to a phenomenon that the water contained in the SOG film exposing to the via hole corrodes a metal wiring arranged in the via hole. In each of the foregoing embodiments, the metal wiring corresponds to the display electrode 4 in the contact hole 21. In order to prevent such phenomenon from occurring, the surface of the SOG film 32 is removed a little by etching back, as shown in FIG. 18, before the second insulation film 31 is formed. Thus, the second insulation film 31 can be layered on the first and second insulation films 20,31 at the site where the contact hole 21 is to be formed. Consequently, the SOG film 32 is prevented from being exposed at the cross section of the contact hole 21 formed. However, this etching back treatment is not particularly required except the cases where high reliability is required of the LCD.

Figure 19A:
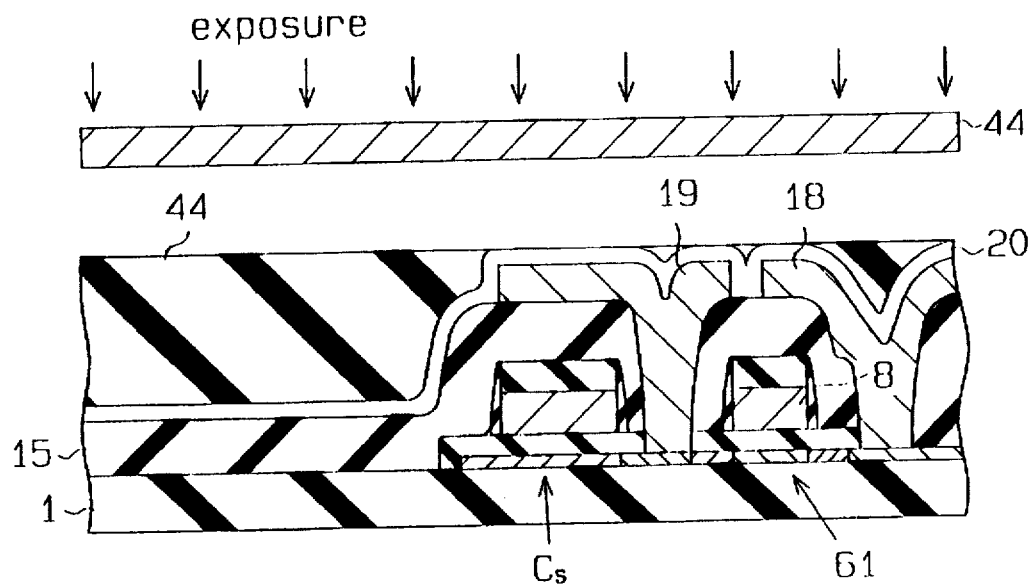
FIGS. 19A, 19B and 19C are schematic cross-sectional views for explaining the process for producing the LCD according to still another embodiment of the invention.
Figure 19B:
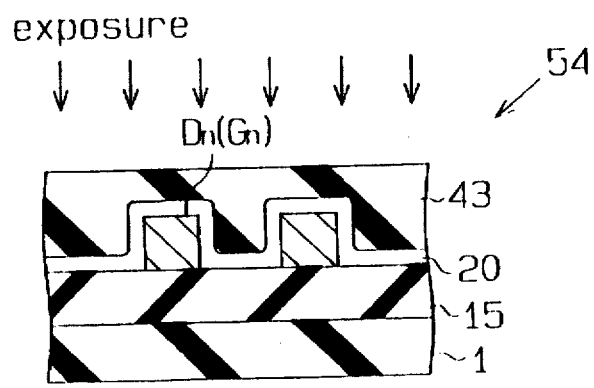
Figure 19C:
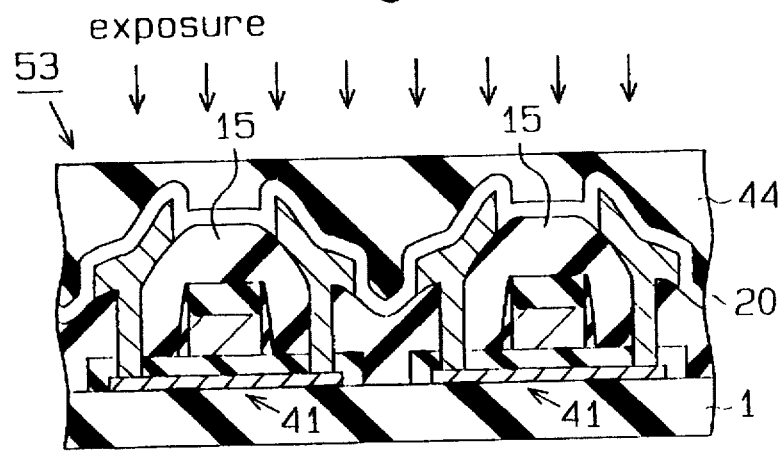

The SOG film 32 may be replaced with a photo-sensitive resin insulation film. For example, as shown in FIGS. 19A, 19B and 19C, the entire surface of the substrate 1 is coated with a positive type photo-sensitive resin insulation film 44, and the first area of the insulation film 44 locating over the pixel portion 50 is covered with a mask, followed by light exposure. Then, only the first area of the photo-sensitive resin insulation film 44 is sensitized and cured but not the second area of the insulation film 44 located over the wiring portion and the peripheral driving circuit 53. The insulation film 44 of the second area is rinsed off to leave the insulation film 44 in the first area corresponding to the pixel portion 50. On the other hand, when a negative type photo-sensitive resin insulation film is employed, the photo-sensitive resin insulation film is applied over the entire surface of the substrate, and the second area of the insulation film 44 is covered with the mask followed by light exposure.

The SOG film 32 may be replaced with a polyimide resin film, an acrylic resin film or an epoxy resin film.

Figure 20:
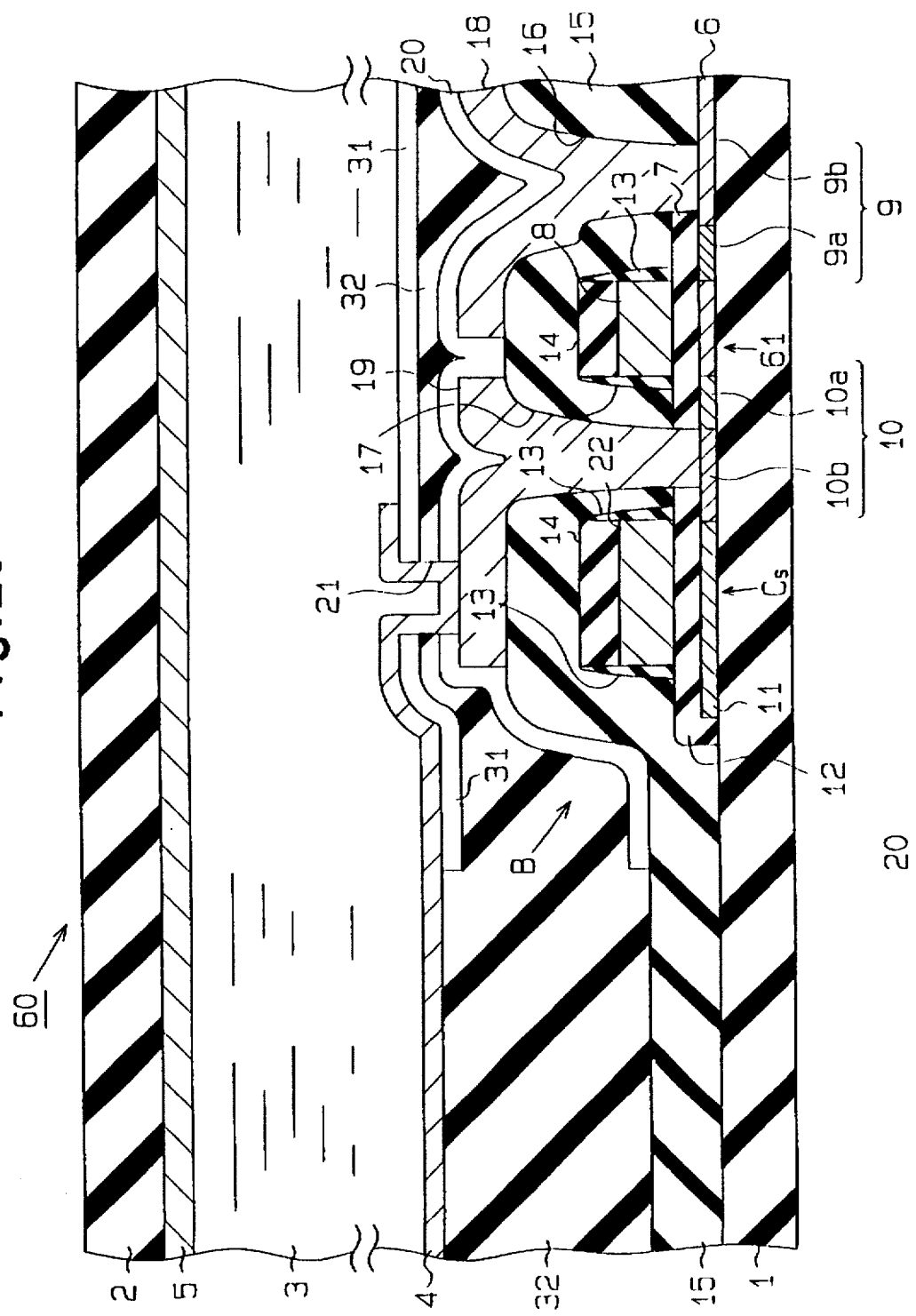
FIG. 20 is a schematic cross-sectional view of the LCD pixel according to a further embodiment of the invention.

As shown in FIG. 20, in the pixel 60, the first and second insulation films 20,31 may be formed only at the portions where the auxiliary capacitance CS, TFT 61 and wiring 18,19 are formed by removing potions of the films 20 and 31 during patterning process. In this case, the first and second insulation films 20 and 31 may be films which do not permit light to transmit therethrough.

In the third embodiment, either the first insulation film 20 or the second insulation film 31 formed on the wiring portion and on the peripheral driving circuit 53 may be omitted.

The TFT 61 may be allowed to have an SD (single drain) structure or a double gate structure instead of the LDD structure. The TFT 41 may have an SD structure instead of the LDD structure.

The channel area between the drain area 9 and the source area 10 may be doped with an impurity to control the threshold voltage (Vth) of the TFT 61. A TFT 61 having as the active layer a polycrystalline silicon film 6 formed by the solid-phase growth method can assume a form of n-type or p-type channel transistor. In the n-type channel transistor, the threshold voltage tends to shift toward depression; while in the p-type channel transistor, the threshold voltage tends to shift toward enhancement. Particularly, when the polycrystalline silicon film 6 is subjected to hydrogenation, such tendencies are more notably observed. In order to control such shift of threshold voltage, the channel area is preferably doped with an impurity.

The present invention may be applied to an LCD from which the auxiliary capacitance CS is omitted.

The present invention may be applied not only to the planar TFT but also to an inverted planar TFT, a staggered TFT and an invertedly staggered TFT.

The present invention may be applied to an amorphous silicon TFT in place of the polycrystalline silicon TFT.

The present invention may be applied not only to an aluminum alloy source electrode but also to other source electrodes made of a conductive material such as a thin film of high-melting metallic simple substance, a high-melting metal compound, a metal silicide and doped polysilicon.

The present invention may be applied not only to the transistor type active matrix addressing mode LCD's employing TFT's as pixel driving elements but also to transistor or diode type active matrix addressing mode LCD's employing bulk transistors as the pixel driving elements. The diode type pixel driving elements include MIM (metal insulator metal), ZnO (zinc oxide), barrister, MSI (metal semi-insulator), BTB (back-to-back diode) and RD (ring diode).

The present invention may be applied to a reflection type LCD. In this case, the first and second insulation films 20,31 need not be light transmissive.

It should be appreciated that the insulating substrate referred to herein not only includes substrates made of all sorts of insulating materials such as quartz substrates, high-heat resistance glass and high-heat resistance resins but also conductive substrates such as metal substrates having insulating layers on the surfaces. The display electrode includes not only the ITO film but also a tin oxide film. The planarizing film includes not only the SOG film but also coating insulation films such as of photo-sensitive resins, polyimide resins, acrylic resins and epoxy resins.

Therefore, the present examples and embodiments are to be considered as illustrative and not restrictive, and the invention is not to be limited to the details given herein, but may be modified within the scope of the appended claims.

What is claimed is:

1. A liquid crystal display unit comprising:
   a first substrate;
   a second substrate opposing to said first substrate;
   pixel driving elements disposed on said first substrate and between said first and second substrates;
   a first insulation layer deposited over said first substrate and said pixel driving elements;
   a planarizing film, formed on said first insulation layer, for providing a substantially flat surface over said first substrate to minimize a height of a step present between an area corresponding to each pixel driving element and an area locating adjacent to said pixel driving element on said first substrate;
   a second insulation layer formed on said planarizing film;
   display electrodes formed on said second insulation layer and electrically connected to said pixel driving elements, respectively; and
   a liquid crystal layer located between said first and second substrates.

2. The liquid crystal display unit according to claim 1, wherein said first insulation layer is formed over said first substrate only at the portions corresponding to the locations of said pixel driving elements; said second insulation layer is formed on said planarizing film only at the portions corresponding to the locations of said pixel driving elements.

3. The liquid crystal display unit according to claim 1, wherein each of said first and said second insulation layers is a film selected from the group consisting of silicon oxide film, silicon nitride film and silicon nitride oxide film.

4. The liquid crystal display unit according to claim 1, wherein each of said first and second insulation layers is a film selected from the group consisting of plasma TEOS film, plasma oxide film and ECR oxide film.

5. The liquid crystal display unit according to claim 1, wherein said planarizing film is colored.

6. The liquid crystal display unit according to claim 1, further comprising auxiliary capacitances which are formed on said first substrate and are electrically connected to said display electrodes, respectively.

7. A built-in driver type liquid crystal display unit comprising a first substrate, a second substrate opposing to the first substrate, a pixel portion and a driving circuit adjacent to the pixel potion, said pixel portion and said driving circuit being formed on said first substrate,
   wherein said pixel portion includes:
      pixel driving elements disposed on said first substrate and between said first and second substrate;
      a first insulation layer deposited over said first substrate;
      a planarizing film, formed on said first insulation layer, for providing a substantially flat surface over said first substrate to minimize a height of a step present between an area corresponding to each pixel driving element and an area located adjacent to said pixel driving element on said first substrate;
      a second insulation layer formed on said planarizing film;
      display electrodes formed on said second insulation layer and electrically connected to said pixel driving elements, respectively; and
      a liquid crystal layer located between said first and second substrates; and
   wherein said driving circuit includes:
      circuit elements disposed on said first substrate;
      a first insulation layer deposited over said circuit elements; and
      a second insulation layer formed on said first insulation layer of said driving circuit.

8. The liquid crystal display unit according to claim 7, wherein said first insulation layer in said pixel portion is formed over said first substrate only at the portions corresponding to the locations of said pixel driving elements; said second insulation layer is formed on said planarizing film only at the portions corresponding to the locations of said pixel driving elements.

9. The liquid crystal display unit according to claim 7, wherein each of said first and second insulation layers of said pixel portion and said driving circuit is a film selected from the group consisting of silicon oxide film, silicon nitride film and silicon nitride oxide film.

10. The liquid crystal display unit according to claim 7, wherein each of said first and second insulation layers of said pixel portion and said driving circuit is a film selected from the group consisting of plasma TEOS film, plasma oxide film and ECR oxide film.

11. The liquid crystal display unit according to claim 7, wherein said planarizing film is colored.

12. The liquid crystal display unit according to claim 7, further comprising auxiliary capacitances which are formed on said first substrate and are electrically connected to said display electrodes, respectively.

13. A process for producing a liquid crystal display unit having a pixel portion containing pixel driving elements, said process comprising the steps of:

forming the pixel driving elements on a substrate;

forming a first insulation film over an entire surface of said substrate and over said pixel driving elements;

forming a planarizing film to provide a substantially flat surface on said first insulation film;

forming a second insulation film on said planarizing film; and forming, on said second insulation film, display electrodes which are connected to said pixel driving elements respectively.

14. The process according to claim 13, wherein each of said steps of forming said first and second insulation films includes a substep of forming one of TEOS film and silicon oxide film by means of plasma CVD; and a substep of subjecting the formed film to ion implantation in order to increase the number of dangling bonds.

15. The process according to claim 13, wherein each of said steps of forming said first and second insulation films includes a substep of forming one of TEOS film and silicon oxide film by means of plasma CVD; and a substep of subjecting the formed film to hydrogen plasma treatment in order to cause the film to have Si—H bonds.

16. The process according to claim 13, further comprising the step of coloring said planarizing film before the formation of said second insulation film.

17. The process according to claim 13, further comprising the step of forming auxiliary capacitances on said substrate during the formation of said pixel driving elements.

18. The process according to claim 13, wherein said planarizing film is formed by using spin-on-glass technique.

19. The process according to claim 13, further comprising the step of removing a portion of said first insulation film where said display electrodes are to be formed before the formation of said planarizing film; and the step of removing a portion of said second insulation film where said display electrodes are to be formed.

20. A process for producing a built-in driver type display unit having a pixel portion and a driving circuit therefor which are formed on a substrate, said process comprising the steps of:

forming the pixel driving elements on said substrate within the area corresponding to said pixel portion;

forming circuit elements on said substrate within the area corresponding to said drive circuit;

forming a first insulation film over the entire surface of said substrate and over said pixel driving elements and said circuit elements;

forming a planarizing film to provide a substantially flat surface on said first insulation film;

removing a portion of said planarizing film at the area corresponding to said driving circuit to expose said first insulation film;

forming a second insulation film on the remaining planarizing film and on said first insulation film thus exposed; and forming display electrodes on said second insulation film within the area corresponding to said pixel portion, said display electrodes being connected to said pixel driving elements respectively.

21. The process according to claim 20, wherein each of said steps of forming said first and second insulation films includes a substep of forming one of TEOS film and silicon oxide film by means of plasma CVD; and a substep of subjecting the formed film to ion implantation in order to increase the number of dangling bonds.

22. The process according to claim 20, wherein each of said steps of forming said first and second insulation films includes a substep of forming one of TEOS film and silicon oxide film by means of plasma CVD; and a substep of subjecting the formed film to hydrogen plasma treatment in order to the film to have Si—H bonds.

23. The process according to claim 20, further comprising the step of coloring said planarizing film before the formation of said second insulation film.

24. The process according to claim 20, further comprising the step of forming auxiliary capacitances on said substrate during the formation of said pixel driving elements.

25. The process according to claim 20, wherein said planarizing film is formed by using spin-on-glass technique.

26. The process according to claim 20, further comprising the step of removing a portion of said first insulation film where said display electrodes are to be formed before the formation of said planarizing film; and the step of removing a portion of said second insulation film where said display electrodes are to be formed.

* * * * *